(12) United States Patent
Jiang et al.

(10) Patent No.: US 7,827,350 B1
(45) Date of Patent: Nov. 2, 2010

(54) METHOD AND SYSTEM FOR PROMOTING A SNAPSHOT IN A DISTRIBUTED FILE SYSTEM

(75) Inventors: Tianyu Jiang, Sunnyvale, CA (US); Omprakaash Thoppai, Sunnyvale, CA (US); Richard P. Jernigan, IV, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 280 days.

(21) Appl. No.: 11/741,626

(22) Filed: Apr. 27, 2007

(51) Int. Cl.
G06F 12/00 (2006.01)

(52) U.S. Cl. ................ 711/114; 711/162; 707/639; 707/649

(58) Field of Classification Search ............. 711/162, 711/114; 707/639, 649
See application file for complete search history.

(56) References Cited

U.S. PATENT DOCUMENTS

| | | | |
|---|---|---|---|
| 4,156,907 A | 5/1979 | Rawlings et al. |
| 4,399,503 A | 8/1983 | Hawley |
| 4,570,217 A | 2/1986 | Allen et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,843,541 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,916,608 A | 4/1990 | Shultz |
| 4,989,206 A | 1/1991 | Dunphy, Jr. et al. |
| 5,124,987 A | 6/1992 | Milligan et al. |
| 5,129,088 A | 7/1992 | Auslander et al. |
| RE34,100 E | 10/1992 | Hartness |

(Continued)

FOREIGN PATENT DOCUMENTS

WO   WO 89/10594   11/1989

OTHER PUBLICATIONS

Borenstein, Nathaniel S., CMU's Andrew project a retrospective, Communications of ACM, 39(12), Dec. 1996, 33 pages.

(Continued)

*Primary Examiner*—Stephen C Elmore
(74) *Attorney, Agent, or Firm*—Cesari and McKenna, LLP

(57) ABSTRACT

A method and system for promoting a snapshot in a distributed striped volume system is provided. A master volume server is configured with a rollback process such that when it is determined that a rollback is required, the master volume server sets a flag persistently in its own raid label on disk. After the persistent flag is set, the master volume server determines a "common snapshot," and starts the process of sending RPC messages to each node hosting constituent volumes instructing each constituent volume to roll back to the identified snapshot. When the nodes receive this message a flag is set in the own raid label of each constituent volume and the volume then promotes the particular snapshot. If the master volume server has not received a successful response from each node that the snapshot promotion was successful within a specified time period, there is a retry. The common snapshot is then used as the active file system, thus providing data recovery for the striped volume set.

30 Claims, 15 Drawing Sheets

U.S. PATENT DOCUMENTS

| | | |
|---|---|---|
| 5,155,835 A | 10/1992 | Belsan |
| 5,163,131 A | 11/1992 | Row et al. |
| 5,202,979 A | 4/1993 | Hillis et al. |
| 5,278,979 A | 1/1994 | Foster et al. |
| 5,355,453 A | 10/1994 | Row et al. |
| 5,426,747 A | 6/1995 | Weinreb et al. |
| 5,485,579 A | 1/1996 | Hitz et al. |
| 5,511,177 A | 4/1996 | Kagimasa et al. |
| 5,568,629 A | 10/1996 | Gentry et al. |
| 5,581,724 A | 12/1996 | Belsan et al. |
| 5,701,516 A | 12/1997 | Cheng et al. |
| 5,764,972 A | 6/1998 | Crouse et al. |
| 5,802,366 A | 9/1998 | Row et al. |
| 5,819,292 A | 10/1998 | Hitz et al. |
| 5,828,876 A | 10/1998 | Fish et al. |
| 5,832,513 A | 11/1998 | Kennedy |
| 5,870,734 A | 2/1999 | Kao |
| 5,897,661 A | 4/1999 | Baranovsky et al. |
| 5,907,672 A | 5/1999 | Matze et al. |
| 5,918,229 A | 6/1999 | Davis et al. |
| 5,931,918 A | 8/1999 | Row et al. |
| 5,941,972 A | 8/1999 | Hoese et al. |
| 5,944,789 A | 8/1999 | Tzelnic et al. |
| 5,963,962 A | 10/1999 | Hitz et al. |
| 5,987,477 A | 11/1999 | Schmuck et al. |
| 6,032,216 A | 2/2000 | Schmuck et al. |
| 6,038,570 A | 3/2000 | Hitz et al. |
| 6,061,770 A | 5/2000 | Franklin |
| 6,065,037 A | 5/2000 | Hitz et al. |
| 6,081,875 A | 6/2000 | Clifton et al. |
| 6,128,627 A | 10/2000 | Mattis et al. |
| 6,173,293 B1 | 1/2001 | Thekkath et al. |
| 6,173,374 B1 | 1/2001 | Heil et al. |
| 6,185,655 B1 | 2/2001 | Peping |
| 6,240,527 B1 | 5/2001 | Schneider et al. |
| 6,275,898 B1 | 8/2001 | DeKoning |
| 6,324,581 B1 | 11/2001 | Xu et al. |
| 6,341,341 B1 | 1/2002 | Grummon et al. |
| 6,397,311 B1 | 5/2002 | Capps et al. |
| 6,425,035 B2 | 7/2002 | Hoese et al. |
| 6,457,021 B1 | 9/2002 | Berkowitz et al. |
| 6,502,166 B1 | 12/2002 | Cassidy |
| 6,516,380 B2 | 2/2003 | Kenchammana-Hoskote |
| 6,564,252 B1 | 5/2003 | Hickman et al. |
| 6,571,261 B1 | 5/2003 | Wang-Knop et al. |
| 6,606,690 B2 | 8/2003 | Padovano |
| 6,618,798 B1 | 9/2003 | Burton et al. |
| 6,636,879 B1 | 10/2003 | Doucette et al. |
| 6,643,654 B1 | 11/2003 | Patel et al. |
| 6,671,773 B2 | 12/2003 | Kazar et al. |
| 6,697,846 B1 | 2/2004 | Soltis |
| 6,721,764 B2 | 4/2004 | Hitz et al. |
| 6,732,124 B1 | 5/2004 | Koseki et al. |
| 6,804,706 B2 | 10/2004 | Pitts |
| 6,868,417 B2 | 3/2005 | Kazar et al. |
| 6,931,450 B2 | 8/2005 | Howard et al. |
| 6,978,283 B1 | 12/2005 | Edwards et al. |
| 7,010,528 B2 | 3/2006 | Curran et al. |
| 7,038,058 B2 | 5/2006 | Lee et al. |
| 7,127,577 B2 | 10/2006 | Koning et al. |
| 7,159,093 B2 | 1/2007 | Dalal et al. |
| 7,162,486 B2 | 1/2007 | Patel et al. |
| 7,185,144 B2 | 2/2007 | Corbett et al. |
| 7,194,597 B2 | 3/2007 | Willis et al. |
| 7,216,135 B2 * | 5/2007 | Sawdon et al. .............. 707/205 |
| 7,231,412 B2 | 6/2007 | Hitz et al. |
| 7,302,520 B2 | 11/2007 | Kazar et al. |
| 7,454,445 B2 | 1/2008 | Lewis et al. |
| 7,366,837 B2 | 4/2008 | Corbett et al. |
| 7,409,494 B2 | 8/2008 | Edwards et al. |
| 7,409,497 B1 | 8/2008 | Jernigan et al. |
| 7,412,496 B2 | 8/2008 | Fridella et al. |
| 2002/0049883 A1 | 4/2002 | Schneider et al. |
| 2003/0188045 A1 | 10/2003 | Jacobson |
| 2004/0030668 A1 | 2/2004 | Pawlowski et al. |
| 2004/0122917 A1 | 6/2004 | Menon et al. |
| 2004/0133570 A1 | 7/2004 | Soltis |
| 2004/0139167 A1 | 7/2004 | Edsall et al. |
| 2005/0097260 A1 | 5/2005 | McGovern et al. |
| 2005/0192932 A1 | 9/2005 | Kazar et al. |
| 2006/0184587 A1 | 8/2006 | Federwisch et al. |
| 2007/0088702 A1 | 4/2007 | Fridella et al. |
| 2007/0094467 A1 * | 4/2007 | Yamasaki .................. 711/162 |

OTHER PUBLICATIONS

Chutani, Sailesh, et al., The Episode File System, In Proceedings of the USENIX Winter 1992, 18 pages.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001, 126 pages.

Gait, Jason, Phoenix: A Safe In-Memory File System. Communications of the ACM, 33(1): pp. 81-86, Jan. 1990.

Hitz, Dave et al., File System Design for an NFS File Server Appliance, Technical Report 3002, Rev. C395, presented Jan. 19, 1994, 23 pages.

Howard, John H., An Overview of the Andrew File System, Carnegie Mellon University, CMU-ITC-88-062 1988, 6 pages.

Howard, John, H. et al., Scale and performance in a distributed file system, ACM Trans. Computer. System., 6(1), Feb. 1988 pp. 51-81.

Kazar, Michael L., et al., Decorum File System Architectural Overview, USENIX Summer Conference, Anaheim, California, 1990, 13 pages.

Kazar, Michael L., Synchronization and Caching Issues in the Andrew File System, Carnegie Mellon University, CMU-ITC-88-063, 12 pages.

Lorie, Raymond, A, Physical Integrity in a large segmented database, ACM Trans. Database Systems, 2(1): 91-104, Mar. 1977.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Ousterhout, John K. et al., The Sprite Network Operating System, Computer Science Division, Department of Electrical Engineering and Computer Sciences, Univ. of CA, Berkley, Nov. 19, 1987, 32 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Quinlan, Sean, A Cached WORM File System, Software-Practice and Experience, 21(12):1289-1299 (1991).

Rosenberg, J., et al., Stability in a Persistant Store Based on a Large Virtual Memory, In Security and Persistence, Rosenber, J. & Keedy, J.L. (ed), Springer-Verlag (1990) pp. 229-245.

Rosenblum, Mendel, et al. The Design and Implementation of a Log-Structured File System Jul. 24, 1991 pp. 1-15.

Rosenblum, Mendel, The Design and Implementation of a Log-Structured File System, 1992, pp. 1-93.

Rosenblum, Mendel, et al., The Design and Implementation of a Log-Structured File System, In Proceedings of ACM Transactions on Computer Systems, (10)1:26-52, Feb. 1992.

Rosenblum, Mendel, et al., The LFS Storage Manager, Computer Science Division, Electrical Engin. And Computer Sciences, Univ. of CA, presented at Summer '90 USENIX Technical Conference, Anaheim, CA Jun. 1990, 16 pages.

Satyanarayanan, M., A survey of distributed file-systems. Annual Review of Computing Science, 4(73-104), 1989.

Satyanarayanan, M., et al., Coda: A highly available file system for a distributed workstation environment. IEEE Transactions on Computers, 39(4):447-459, 1990.

Seltzer, Margo I., et al., Journaling Versus Soft Updates: Asynchronous Meta-Data Protection in File Systems, Proceedings of 200 USENIX Annual Technical Conference, Jun. 18-23, 2000.

Sidebotham, Bob, Volumes: The Andrew File System Data Structuring Primitive, EEUG Conference Proceedings, Manchester, UK, Autumn 1986.

Patterson, D.A., *A Case for Redundant Arrays of Inexpensive Disks (RAID)*, Proceedings of the International Conference on Management of Data (SIGMOD), Jun. 1988.

\* cited by examiner

FIG. 10

METHOD AND SYSTEM FOR PROMOTING A SNAPSHOT IN A DISTRIBUTED FILE SYSTEM

BACKGROUND OF THE INVENTION

1. Field of the Invention

The present invention relates to distributed striped file systems and more specifically to data recovery in such systems.

2. Background Information

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in A CASE FOR REDUNDANT ARRAYS OF INEXPENSIVE DISKS (RAID), by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of data containers, such as directories, files and blocks. For example, each "on-disk" file may be implemented as set of data structures, i.e., disk blocks, configured to store information, such as the actual data for the file. These data blocks are is organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n–1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout WAFL® file system available from Network Appliance, Inc., Sunnyvale, Calif.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are "hidden" from the file system and, thus, are only visible to the RAID system. The RAID system typically organizes the RAID groups into one large "physical" disk (i.e., a physical volume), such that the disk blocks are concatenated across all disks of all RAID groups. The logical volume maintained by the file system is then "disposed over" (spread over) the physical volume maintained by the RAID system.

The storage system may be configured to operate according to a client/server model of information delivery to thereby allow many clients to access data containers, such as directories, files and blocks stored on the system. In this model, the client may comprise an application, such as a database application, executing on a computer that is "connects" to the storage system over a computer network, such as a point-to-point link, shared local area network (LAN), wide area network (WAN) or virtual private network (VPN) implemented over a public network, such as the Internet. Each client may request the services of the file system by issuing file-based and block-based protocol messages (in the form of packets) to the storage system over the network. By supporting a plurality of file system protocols, such as the conventional Common Internet File System (CIFS) and the Network File System (NFS) protocols, the utility of the storage system is enhanced.

When accessing a block of a file in response to servicing a client request, the file system specifies a vbn that is translated at the file system/RAID system boundary into a disk block number (dbn) location on a particular disk (disk, dbn) within a RAID group of the physical volume. Each block in the vbn space and in the dbn space is typically fixed, e.g., 4 k bytes (kB), in size; accordingly, there is typically a one-to-one mapping between the information stored on the disks in the dbn space and the information organized by the file system in the vbn space. The (disk, dbn) location specified by the RAID system is further translated by a disk driver system of the storage operating system into a plurality of sectors (e.g., a 4 kB block with a RAID header translates to 8 or 9 disk sectors of 512 or 520 bytes) on the specified disk.

The requested block is then retrieved from disk and stored in a buffer cache of the memory as part of a buffer tree of the file. The buffer tree is an internal representation of blocks for a file stored in the buffer cache and maintained by the file system. Broadly stated, the buffer tree has an inode at the root (top-level) of the file. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Each pointer may be embodied as a vbn to facilitate efficiency among the file system and the RAID system when accessing the data on disks.

The RAID system maintains information about the geometry of the underlying physical disks (e.g., the number of blocks in each disk) in raid labels stored on the disks. The RAID system provides the disk geometry information to the file system for use when creating and maintaining the vbn-to-disk, dbn mappings used to perform write allocation operations and to translate vbns to disk locations for read operations. Block allocation data structures, such as an active map, a snapmap, a space map and a summary map, are data structures that describe block usage within the file system, such as the write-anywhere file system. These mapping data structures are independent of the geometry and are used by a write allocator of the file system as existing infrastructure for the logical volume.

A persistent consistency point image of a file system may be taken for purposes of recovery in many types of file systems such as copy-on-write and the like. A write-anywhere file system (such as the WAFL file system) also has the capability to generate a persistent consistency point image, i.e., a snapshot of its active file system. An "active file system" is a file system to which data can be both written and read or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. In the case of the WAFL file system, a PCPI is always an active file system image that contains complete information about the file system, including all metadata. A PCPI can also include other information (metadata) about the active file system at the particular point in time for which the image is taken. The terms "PCPI" and "snapshot" may be used interchangeably through out this patent without derogation of Network Appliance's trademark rights.

The write-anywhere file system supports multiple snapshots that are generally created on a regular schedule. Each snapshot refers to a copy of the file system that diverges from the active file system over time as the active file system is modified. In the case of the WAFL® file system, the active file system diverges from the snapshots since the snapshots stay in place as the active file system is written to new disk locations. Each snapshot is a restorable version of the storage element (e.g., the active file system) created at a predetermined point in time and, as noted, is "read-only" accessible and "spaceconservative". Space conservative denotes that common parts of the storage element in multiple snapshots share the same file system blocks. Only the differences among these various snapshots require extra storage blocks. The multiple snapshots of a storage element are not independent copies, each consuming disk space; therefore, creation of a snapshot on the file system is instantaneous, since no entity data needs to be copied. Read-only accessibility denotes that a snapshot cannot be modified because it is closely coupled to a single writable image in the active file system. The closely coupled association between a file in the active file system and the same file in a snapshot obviates the use of multiple "same" files. In the example of a WAFL® file system, snapshots are described in *TR3002 File System Design for a NFS File Server Appliance* by David Hitz et al., published by Network Appliance, Inc. and in U.S. Pat. No. 5,819,292 entitled Method for Maintaining Consistent States of a File System and For Creating User-Accessible Read-Only Copies of a File System, by David Hitz et al., each of which is hereby incorporated by reference as though fully set forth herein.

The active map denotes a file including a bitmap associated with a free status of the active file system. As noted, a logical volume may be associated with a file system; the term "active file system" refers to a consistent state of a current file system. The summary map denotes a file including an inclusive logical OR bitmap of all snapmaps. By examining the active and summary maps, the file system can determine whether a block is in use by either the active file system or any snapshot. The space map denotes a file including an array of numbers that describe the number of storage blocks used (counts of bits in ranges) in a block allocation area. In other words, the space map is essentially a logical OR bitmap between the active and summary maps to provide a condensed version of available "free block" areas within the vbn space. Examples of snapshot and block allocation data structures, such as the active map, space map and summary map, are described in U.S. Patent Application Publication No. US2002/0083037 A1, titled Instant Snapshot, by Blake Lewis et al. and published on Jun. 27, 2002, which application is hereby incorporated by reference.

The write-anywhere file system typically performs write allocation of blocks in a logical volume in response to an event in the file system (e.g., dirtying of the blocks in a file). When write allocating, the file system uses the block allocation data structures to select free blocks within its vbn space to which to write the dirty blocks. The selected blocks are generally in the same positions along the disks for each RAID group (i.e., within a stripe) so as to optimize use of the parity disks. Stripes of positional blocks may vary among other RAID groups to, e.g., allow overlapping of parity update operations. When write allocating, the file system traverses a small portion of each disk (corresponding to a few blocks in depth within each disk) to essentially "lay down" a plurality of stripes per RAID group. In particular, the file system chooses vbns that are on the same stripe per RAID group during write allocation using the vbn-to-disk,dbn mappings.

A plurality of storage systems may be interconnected as a cluster to provide a storage system environment configured to service many clients. Each storage system may be configured to service one or more volumes, wherein each volume stores one or more data containers. Yet often a large number of data access requests issued by the clients may be directed to a small number of data containers serviced by a particular storage system of the cluster. A solution to such a problem is to distribute the volumes serviced by the particular storage system among all of the storage systems of the cluster. This, in turn, distributes the data access requests, along with the processing resources needed to service such requests, among all of the storage systems, thereby reducing the individual processing load on each storage system. However, a noted disadvantage arises when only a single data container, such as a file, is heavily accessed by clients of the cluster. As a result, the storage system attempting to service the requests directed to that data container may exceed its processing resources and become overburdened, with a concomitant degradation of speed and performance.

One technique for overcoming the disadvantages of having a single data container that is heavily utilized is to stripe the data container across a plurality of volumes configured as a striped volume set (SVS), where each volume is serviced by a different storage system, thereby distributing the load for the single data container among a plurality of storage systems. A technique for data container striping is described in the above-referenced U.S. patent application Ser. No. 11/119,278, entitled STORAGE SYSTEM ARCHITECTURE FOR STRIPING DATA CONTAINER CONTENT ACROSS VOLUMES OF A CLUSTER.

In one data container striping arrangement, meta-data, e.g., time stamps, file length and access control lists, (ACL) associated with a data container (e.g., a file) may also be striped across (or stored on) each volume of the SVS. However, a disadvantage of this arrangement involves the latency incurred when acquiring and updating such meta-data needed to service a data access request directed to the file. For example, changes to the meta-data resulting from servicing of the request may need to be propagated to every volume. This substantially increases the number of accesses to the storage systems serving the volumes, thereby adversely impacting the processing capabilities available for servicing other client data access requests.

An alternative arrangement may be to designate a single volume of the SVS as a meta-data volume (MDV) configured to store a canonical (i.e., definitive) copy of the meta-data associated with all files stored on the SVS. Here, each storage system hosting a SVS volume and servicing a data access request directed to a file is required to contact the MDV in order to ascertain and update the status of meta-data associated with the file. This arrangement places a substantial load on the storage system serving the MDV with a concomitant decrease in system performance. Moreover, depending on the load of the SVS, the meta-data requests to/from the MDV may become a bottleneck, causing certain storage systems to stall (wait) until their meta-data requests have been processed before servicing client data access requests.

In a distributed storage system environment, the constituent volumes of a SVS typically reside on multiple storage systems or nodes in a cluster. A snapshot may be generated across the striped volume set to obtain a consistent data point image. Snapshots are typically generated periodically according to an external schedule. Specifically, is a constituent snapshot is generated for each constituent volume of the SVS to form a series of constituent snapshots that together form a complete snapshot of the active file system for the entire SVS. However, a failure associated with one of the volumes or nodes hosting the volumes in the cluster may negate successful generation of a constituent snapshot for a particular series, in which case the obtained data point image is not consistent.

In response to a failure of a volume hosted by a storage system of a conventional storage system environment, an administrator may revert to an earlier snapshot in order to determine that the latest read-only image of the active file system that is consistent. However, reversion of a snapshot is more complicated in an environment that stripes data containers across multiple volumes served by nodes distributed throughout a cluster. Therefore, there remains a need for a technique that simplifies reversion of an earlier snapshot in order to acquire a consistent data point image in a distributed striped volume set environment.

SUMMARY OF THE INVENTION

The present invention overcomes the disadvantages of the prior art by providing a technique for promoting a snapshot in a storage system environment comprising a plurality of volumes organized as a striped volume set (SVS) and distributed across a plurality of nodes interconnected as a cluster. The novel technique can be used to provide a data recovery mechanism, or in other circumstances in which an administrator prefers to view the cluster as it existed at a previous point in time. A method and system of the present invention uses snapshots that are routinely generated as scheduled in the cluster. In accordance with the invention, when a snapshot is generated for the SVS, the snapshot of each volume in the SVS is assigned the same master snapshot identifier and also its own unique snapshot data set identifier. Thus, each snapshot of each constituent volume has the same master snapshot identifier for a particular snapshot of the striped volume set.

Illustratively, the SVS contains two or more constituent volumes across which one or more data containers are striped. One of these volumes is illustratively designated is a meta-data volume (MDV) and the node of the cluster that is configured to serve the MDV is referred to as the MDV node.

In accordance with the invention, a master volume server is configured to perform a rollback procedure in cases in which a snapshot is to be promoted. In an illustrative embodiment of the invention, the MDV node is designated as the master volume server. In such cases, the MDV node becomes aware of a requirement to return the cluster to an earlier snapshot, i.e., a need to "rollback" to a previous snapshot. The MDV node detects this requirement by one of a number of mechanisms. For example, the MDV node may receive a command from an administrator to rollback to a snapshot specified by the administrator. Alternatively, the MDV node may detect a failure of a node in the cluster that hosts one or more constituent volumes. And in yet another instance, the MDV node may discover an indication at a data volume (DV) node notifying the MDV node that a rollback is required by that DV node, as discussed further herein.

When it is determined that a rollback is required, the MDV node sets a flag persistently in its raid label on disk. After the persistent flag is set, the MDV node determines a "common snapshot." Illustratively, the MDV node calculates the common snapshot by polling each DV node in the cluster as to whether that node has a constituent snapshot in a particular snapshot. Specifically, the MDV node searches for a common snapshot by querying each DV node in the cluster as to whether it has a particular snapshot identified by the master snapshot identifier; if each DV node in the cluster has such a snapshot, it is referred to herein a common snapshot. The cluster may then be returned to a consistent data point image or state represented by that common snapshot. Accordingly, as used herein, there is a "rollback" to that common snapshot, or stated another way, that common snapshot is "promoted" as the active file system.

The MDV node then marks a rollback flag with an identification of the particular common snapshot identified by the master snapshot identifier, which is to be promoted. The MDV node thereafter initiates a process of sending messages, e.g., remote procedure call (RPC) messages, to each DV node instructing each node to roll back to the identified snapshot. Upon receiving this message, each DV node reverts to that particular snapshot, is using a known procedure that involves "freeing up" old blocks etc. that are not needed and thus promotes the identified common snapshot to be the active file system. The DV node then clears its rollback flag and sends a response to the MDV node indicating that it has successfully rolled back to the identified common snapshot. Notably, the MDV node does not clear its rollback flag until it receives a response from each DV node. If it has not received a successful response from each DV node within a specified time period, the MDV node initiates a retry, i.e., the MDV node retries the process described above. Once the common snapshot is successfully promoted in each of the constituent volumes in the SVS, then the messages are no longer sent and the persistent flag in the MDV raid label is cleared.

Advantageously, the present invention utilizes snapshots previously generated by nodes of the cluster on the constituent volumes of the SVS for data recovery in the event of either failure or an administrative requirement to roll back to an earlier snapshot. This allows for simple and efficient snapshot promotion in a striped volume set environment.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 10 is a schematic block diagram of a striped volume set (SVS) in accordance with an illustrative embodiment of the present invention;

DETAILED DESCRIPTION OF AN ILLUSTRATIVE EMBODIMENT

The present invention provides a technique for promoting a snapshot in a storage system environment comprising a plurality of volumes organized as a striped volume set (SVS) and distributed across a plurality of nodes interconnected as a cluster.

A. Cluster Environment

Figure 1:
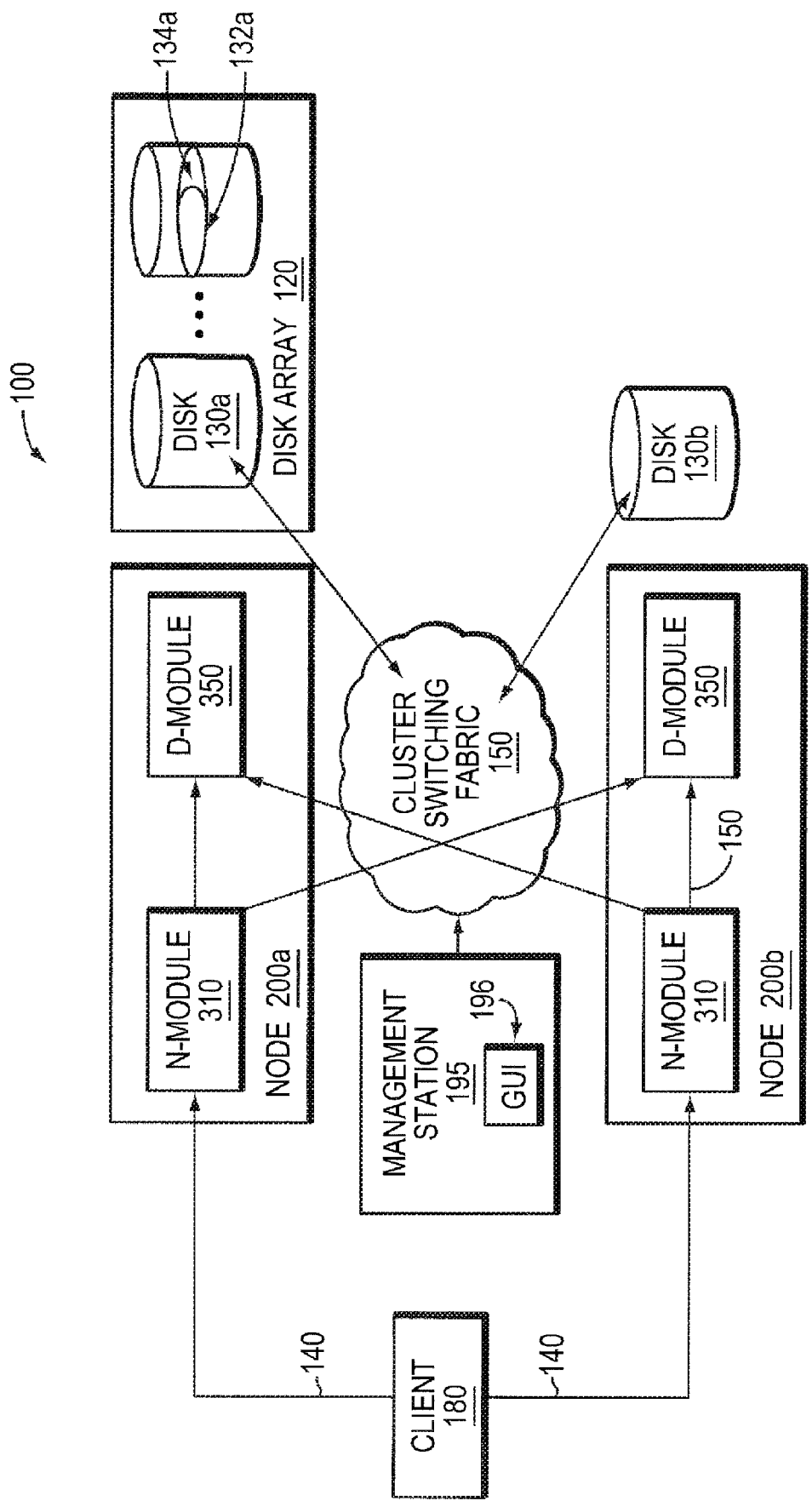
FIG. 1 is a schematic block diagram of a plurality of nodes interconnected as a cluster in accordance with an illustrative embodiment of present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. Exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client is may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

A management station 195, sometimes referred to as an M-host, also communicates over the cluster switching fabric 150. This management station is operated and controlled by an administrator who may send instructions in a maintenance mode of the cluster whereby the administrator can assign disks, reassign disks, or otherwise modify the disk topology or other configuration of the cluster 100. The management station 195 illustratively contains a graphic user interface (GUI) 196 or command line interface (CLI, not shown) whereby the administrator can interact with the software on the management station 195 in order to maintain, configure, and control the cluster 100. For example, the administrator can issue a command to promote a common snapshot in accordance with the present invention as described in further detail herein.

B. Storage System Node

Figure 2:
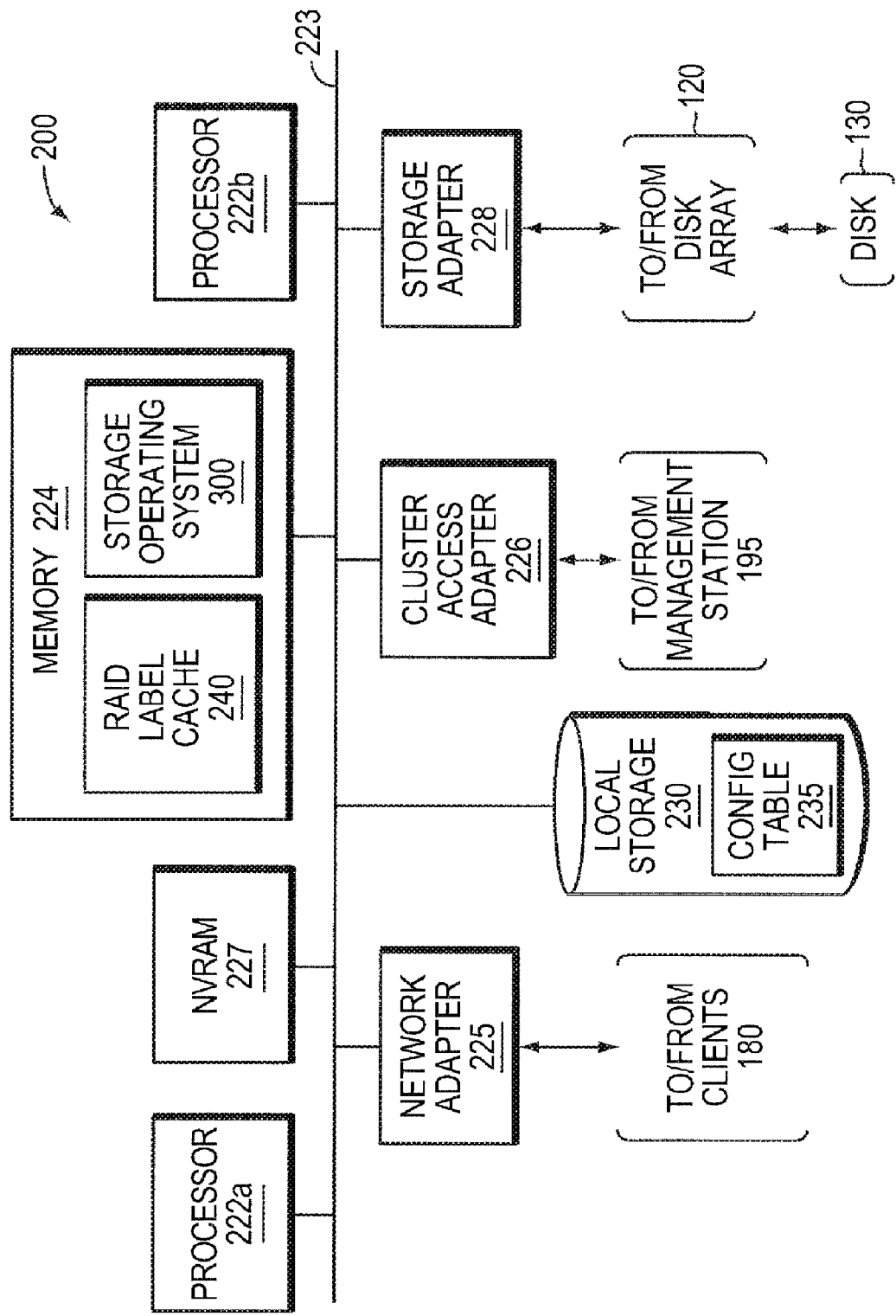
FIG. 2 is a schematic block diagram of a node in accordance with an embodiment of the present invention.

FIG. 2 is a schematic block diagram of a node 200 that is illustratively embodied as a storage system comprising a plurality of processors 222 a,b, a memory 224, a network adapter 225, a cluster access adapter 226, an NVRAM 227 (non-volatile random access memory), a storage adapter 228 and local storage 230 interconnected by a system bus 223. The local storage 230 comprises one or more storage devices, such as disks, which can be utilized by the node to locally store configuration information (e.g., in configuration table 235) provided by one or more management processes that execute as user mode applications 900 (see FIG. 9). Alternatively, such information may be stored remotely. The cluster access adapter 226 comprises a plurality of ports adapted to couple the node 200 to other nodes of the cluster 100. In the illustrative embodiment, Ethernet is used as the clustering protocol and interconnect media, although it will be apparent to is those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

The NVRAM 227 is a non-volatile random access memory device that is used, inter alia, in a performance enhancement manner to avoid the latency which can be associated with writing data to disks. More specifically, as will be understood by those skilled in the art, a write request issued by a client is not acknowledged as having been received successfully until the write data has been persistently stored on the storage system. Illustratively, in the present cluster environment, the write data of a client-issued write request is first persistently stored in the NVRAM 227 of the node 200 having the D-module that currently owns the relevant disk. The write data is also written to a backup NVRAM of another D-module in the cluster prior to the write request being acknowledged to the client. Later, at a consistency point, the write data is written from the NVRAM on the "owner" D-module to the actual disk. However, in order to avoid latency associated with this procedure, the cluster may be configured such that an acknowledgement to the client that the write request has completed may be sent as soon as the data is first persistently stored to the NVRAM 227 of the owner D-module in the cluster. Later, the new write data stored in the NVRAM of the D-module is replayed and written persistently to its respective disk(s).

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of is the D-module 350.

The memory 224 illustratively comprises storage locations that are addressable by the processors and adapters for storing software program code and data structures associated with the present invention. For example, a portion of the memory may be organized as a raid label cache 240 having locations used to store raid label data structures in accordance with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named data containers, such as directories and files, on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of data containers, such as blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
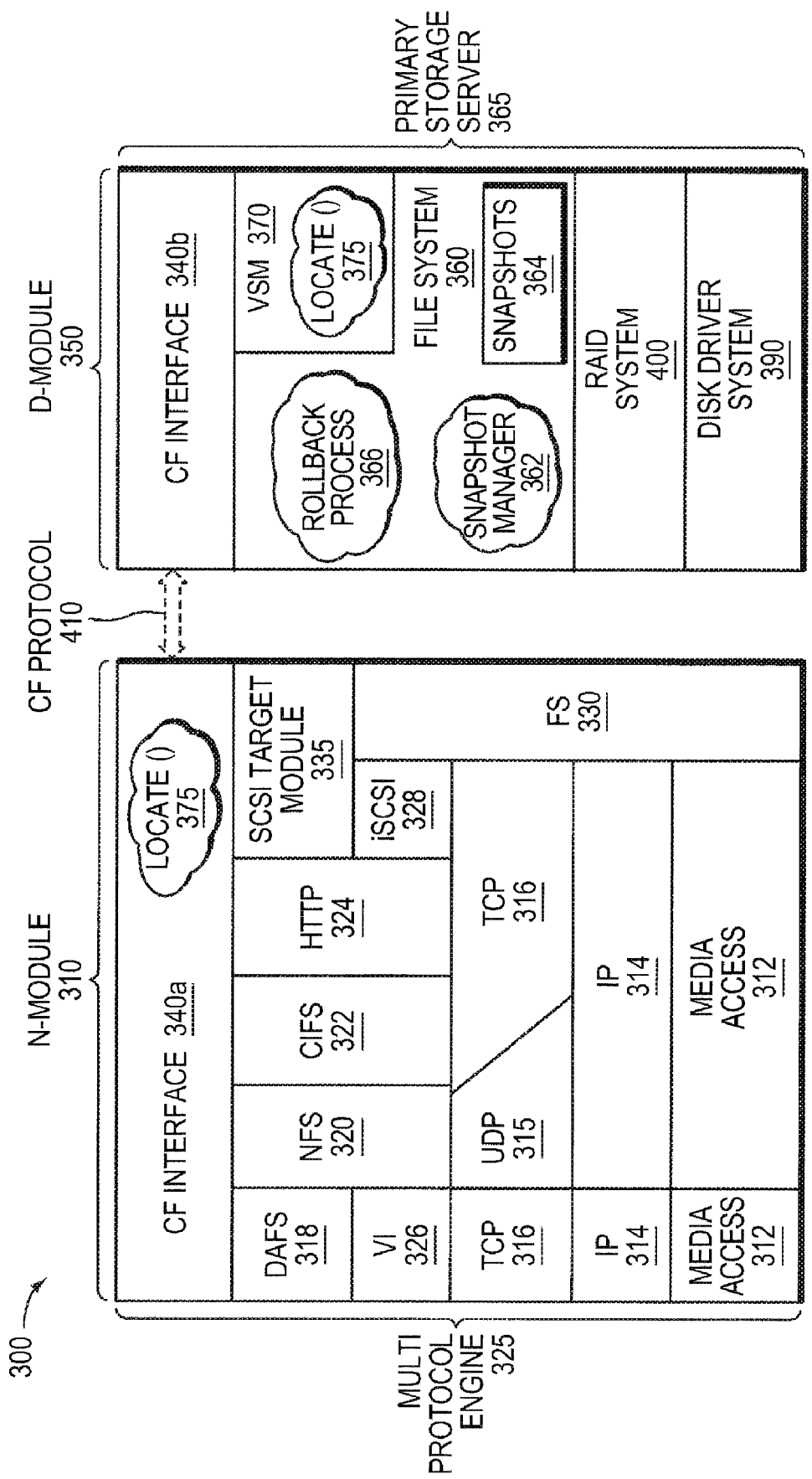
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 400 and a disk driver system module 390. The RAID system 400 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS) of the present invention. As described further herein, the VSM cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 910 (see FIG. 9), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

As described further herein, the file system 360 further includes a snapshot manager 362 that is configured to efficiently perform a snapshot process in which a snapshot of the active file system (e.g. inodes and blocks) of the storage system (primary server) is captured and stored in a snapshot storage area 364. By "active file system" it is meant that the file system to which current I/O operations are being directed. Once a snapshot is obtained, the active file system is reestablished leaving the snapshot in place for possible future restoration, as further described herein. Notably, a snapshot is an image (typically read only) of the entire file system as it existed when the snapshot was taken. The snapshot is stored on the same primary server as the active file system and is accessible by users of the active file system. In the distributed striped volume set (SVS) environment of the present invention, a constituent snapshot is taken of each volume in the SVS and stored on its associated host primary storage server. In the striped file system, the snapshot is generated as a coordinated snapshot. Specifically, proper locks are placed to temporarily block the modification of the active file system across the striped volume. Then, each constituent volume generates its snapshot; the locks are thereafter released to allow modification of the active file system.

In the illustrative embodiment of a write anywhere environment, when data of a block is to be changed/modified, instead of editing that original block, a new block is allocated.

Thus, as snapshots are generated the newly allocated blocks are captured in the is new snapshots. Each block of a data container, such as a file, is said to be "owned" by a snapshot and in particular, in the illustrative example each block is owned by the first snapshot in which it appeared, i.e. the oldest snapshot that contains that block or file. A common snapshot as used herein is a snapshot that exists for each of the constituent volumes of a SVS as generated in a particular SVS snapshot, and in accordance with the invention is identified by the same STRIPED_SNAPSHOT_MSID. This provides a data consistency point image of the active file system for the SVS at that point in time.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage is serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. RAID System

Figure 4:
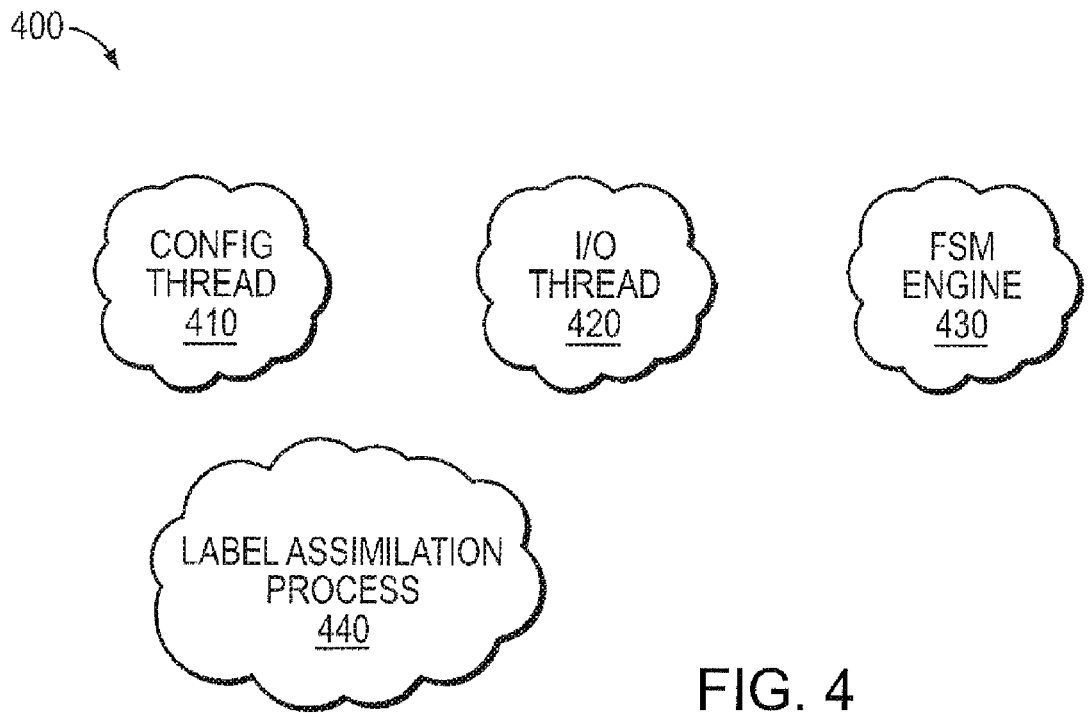
FIG. 4 is a schematic block diagram illustrating processes and threads of a RAID subsystem of the storage operating system of FIG. 3.

The present invention is implemented in the context of a configuration management framework used to implement the RAID system 400 in the storage operating system 300. In a preferred embodiment, the configuration management framework provides an object-oriented approach to RAID configuration management, as described herein with respect to an implementation of the RAID system. FIG. 4 is a schematic block diagram illustrating one or more modules or processes and threads of RAID system 400, wherein each process has among other things, a (virtual) memory address space, executable code and data. A process is started with a single thread, but can create additional threads from any of its threads. The threads execute in the same memory address space and can therefore work concurrently on shared data. A configuration (config) thread 410 is adapted to maintain relationships among and invoke behaviors of decomposed software components ("RAID objects") that collectively form the behaviors associated with a collection of (RAID) volumes on the storage system. In addition, an I/O manager module implements an I/O thread 420 configured to issue I/O transaction requests from the RAID system to the disk driver subsystem, and, upon completion processes the results.

A finite state machine (FSM) module or engine 430 is used to arbitrate a set of events and states that a processor thread of the RAID system may encounter. Transactional semantics isolate the behavior of state changes in the RAID system from concurrent I/O operations. The framework provides a two-phase commit procedure, coordinated with updates to on disk configuration data ("labels"). Errors during disk label updates are handled by aborting the transaction, releasing partially committed data and unwinding any pending state transitions. A state notification mechanism integrated with the FSM engine 430 propagates state changes through the threads in order to provide a coordinated behavior. The label assimilation process 440 coordinates with the FSM engine 430 to effect updates in changes regarding the configuration labels.

According to the configuration management framework, the volume comprises the aggregate behavior of a number of RAID objects. Each RAID object comprises operational code and static state, such as configuration information relating to the topology of the underlying physical storage devices, e.g., disks 130, contained in the disk array 120 by the RAID system.

Figure 5:
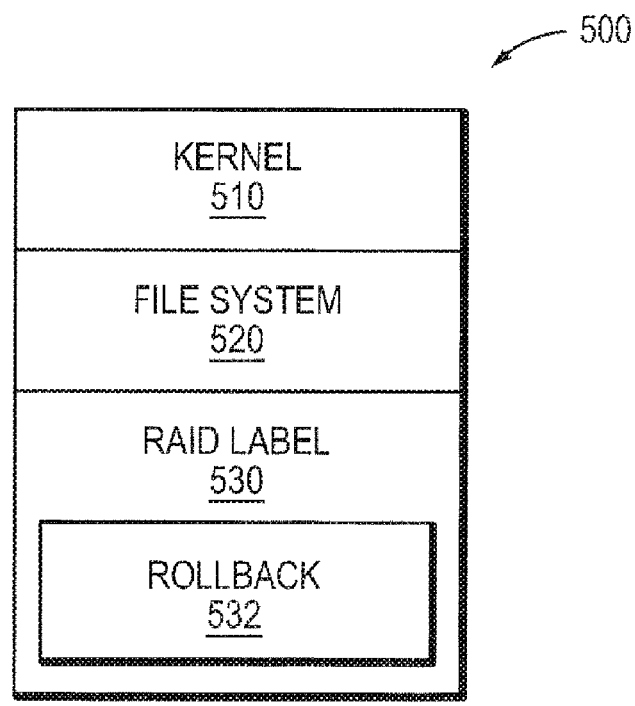
FIG. 5 is a schematic block diagram illustrating the form of the disk coupled to the storage system of FIG. 1.

FIG. 5 is a schematic block diagram illustrating the format 500 of a disk, such as disk 130. Various tiers of information are stored on the disk, including control information outside of the dbn range of the disk and data within the dbn range. A section 520 of the disk may be used to store data within the dbn range comprising file system information including user data (in the case of a data disk) or parity information (in the case of a parity disk). Note that the dbn range may be logically apportioned into multiple pieces, in order to support non-contagious vbn ranges and/or vbn ranges associated with different volumes.

The control information outside the dbn range includes, but is not limited to, a table of contents that describes the entire layout of the disk (the locations of subsequent sections) and sections associated with disk ownership, RAID control information, and other configuration data. In addition, as illustratively shown, section 510 of the disk may be used to store kernel and boot image code of the storage operating system, and section 530 of the disk may be used to store raid labels and, in particular, the configuration information needed to describe the manner in which a disk is assembled to fit into the volume.

The configuration information stored in the raid label 530 describes the RAID is group to which the disk belongs, along with all parent objects associated with the disk. Therefore, there is a region within the raid label 530 for each parent object of a configuration tree associated with the disk storing the raid label. The parent objects of the configuration tree (above the disk drives) are in-core memory objects that are created at the time the volume is assimilated. Assimilation of a volume generally comprises reading (retrieving) the configuration information for all labels on all disks of the volume and then using that information to construct the configuration tree for the volume. The configuration information retrieved from the labels during assimilation includes raid maps used to describe the topology of the volume. In accordance with the present invention the raid label 530 also includes a ROLLBACK section 532, which includes a ROLLBACK REQUIRED flag, and a recorded snapshot identification of the snapshot involved in a particular rollback process in accordance with the invention. These are set persistently by the module hosting a meta-data volume (MDV) of a SVS in order to initiate and maintain a rollback procedure for data recovery or administrative purposes, as described herein. Similarly, each data volume (DV) at the SVS also contains a raid label, and a flag may be set persistently by a D-module serving the DV in order to notify the MDV that a rollback is required, for example, due to a failure of an NVRAM associated with one of the constituent volumes, as described herein.

E. CF Protocol

Referring again to FIG. 3, the storage server 365 is illustratively embodied as D-module 350 of the storage operating system 300 to service one or more volumes of array 120. In addition, the multi-protocol engine 325 is illustratively embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340*a, b* adapted to implement intra-cluster communication among the modules, including D-module-to-D-module communication for data container striping operations described herein.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF enis coder and CF decoder. The CF encoder of, e.g., CF interface 340*a* on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340*b* on D-module 350 de-encapsulates the CF message and processes the file system command.

Figure 6:
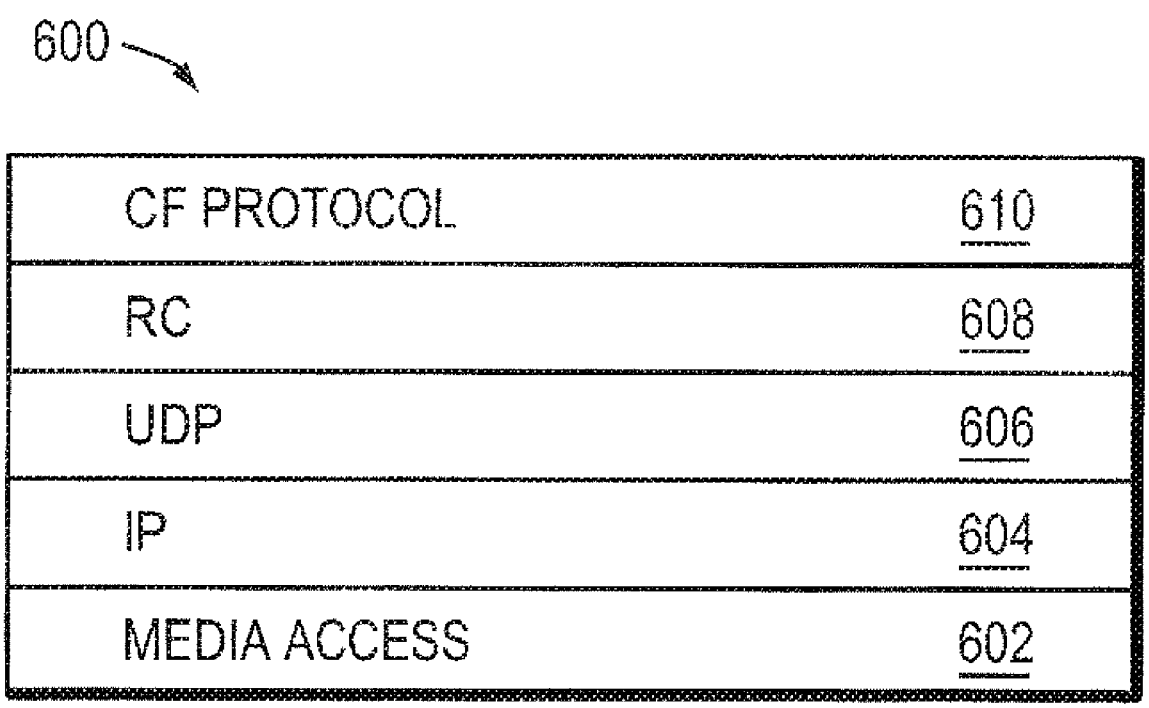
FIG. 6 is a schematic block diagram illustrating the format of a cluster fabric (CF) message in accordance with an illustrative embodiment of the present invention.

FIG. 6 is a schematic block diagram illustrating the format of a CF message 600 in accordance with an embodiment of with the present invention. The CF message 600 is illustratively used for RPC communication over the switching fabric 150 between remote modules of the cluster 100; however, it should be understood that the term "CF message" may be used generally to refer to LPC and RPC communication between modules of the cluster. The CF message 600 includes a media access layer 602, an IP layer 604, a UDP layer 606, a reliable connection (RC) layer 608 and a CF protocol layer 610. As noted, the CF protocol is a generic file system protocol that conveys file system commands related to operations contained within client requests to access data containers stored on the cluster 100; the CF protocol layer 610 is that portion of message 600 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 608 implements a reliable transport protocol that is adapted to process such envelopes in accordance with a connectionless protocol, such as UDP 606.

F. File System Organization

In the illustrative embodiment, a data container, such as a file, is accessed in the file system by a data container handle, and the data container is represented in the write-anywhere file system as an inode data structure adapted for storage on the disks 130. The in-core and on-disk format structures of the WAFL® file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 7A:
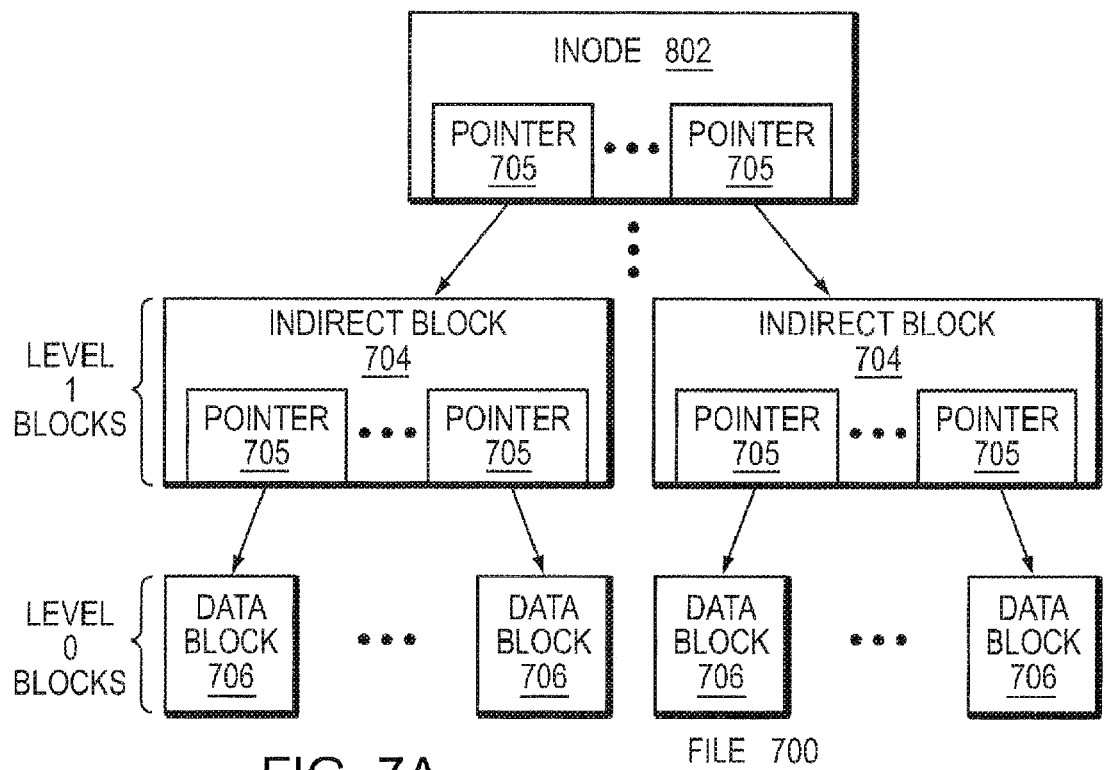
FIG. 7A is a schematic block diagram of an exemplary inode tree in accordance with an illustrative embodiment of the present invention.

FIG. 7A is a schematic block diagram of an embodiment of a buffer tree of a file that may be advantageously used with the present invention. The buffer tree is an internal representation of blocks for a file (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. patent application Ser. No. 10/836,817 titled EXTENSION OF WRITE ANYWHERE FILE SYSTEM LAYOUT, by John K. Edwards et al. and assigned to Network Appliance, Inc. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., Mode or indirect block). On a read path of a logical volume, a "logical" volume (vol) info block has one or more pointers that reference one or more fsinfo blocks, each of which, in turn, points to an Mode file and its corresponding Mode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 7B:
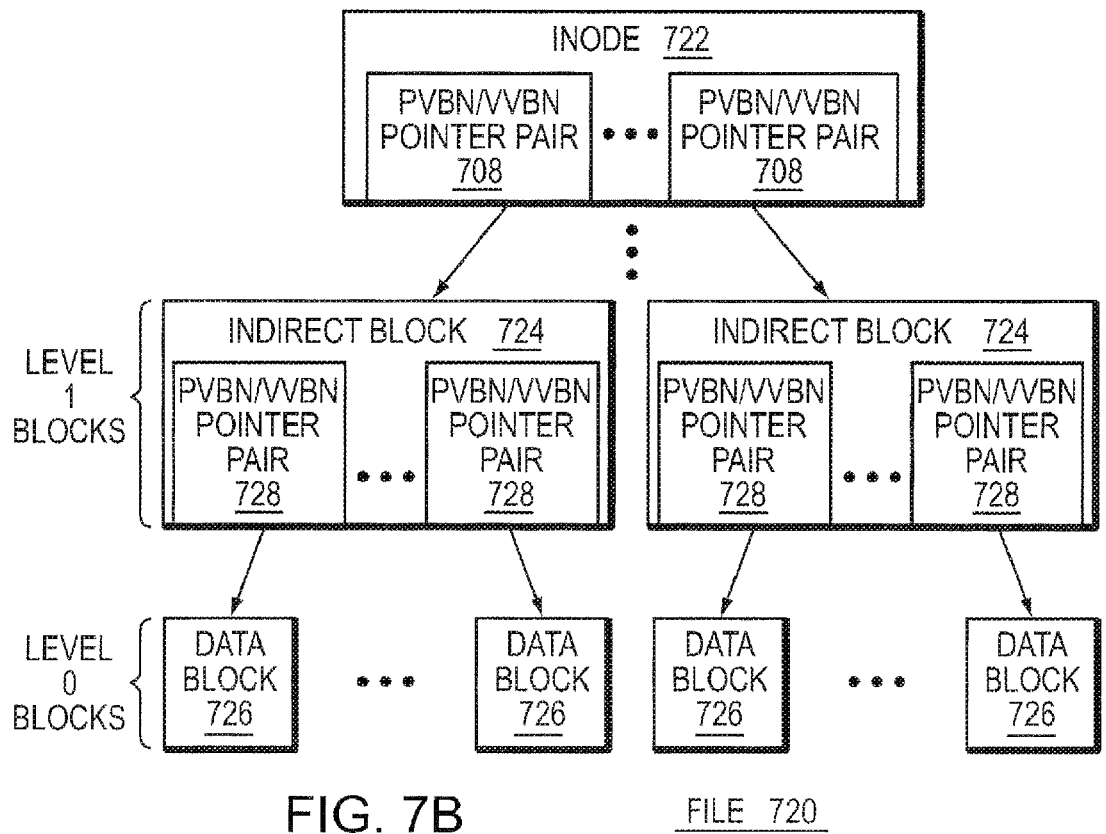
FIG. 7B is a schematic block diagram of an illustrative embodiment of an inode tree of a file that may be advantageously used with the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, Mode file level 0 (L0) blocks. FIG. 7B is a schematic block diagram of an illustrative embodiment of a buffer tree of a file 720 that may be advantageously used with the present invention. A root (top-level) Mode 722, such as an embedded Mode, references indirect (e.g., level 1) blocks 724. Note that there may be additional levels of indirect blocks (e.g., level 2, level 3) depending upon the size of the file. The indirect blocks (and inode) contain pvbn/vvbn pointer pair structures 728 that ultimately reference data blocks 706 used to store the actual data of the file.

The pvbns reference locations on disks of the aggregate, whereas the vvbns reference locations within files of the flexible volume. The use of pvbns as block pointers 728 in the indirect blocks 724 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perm form pvbn-to-vvbn translations; yet, on the read path, the pvbn is available.

Figure 8:
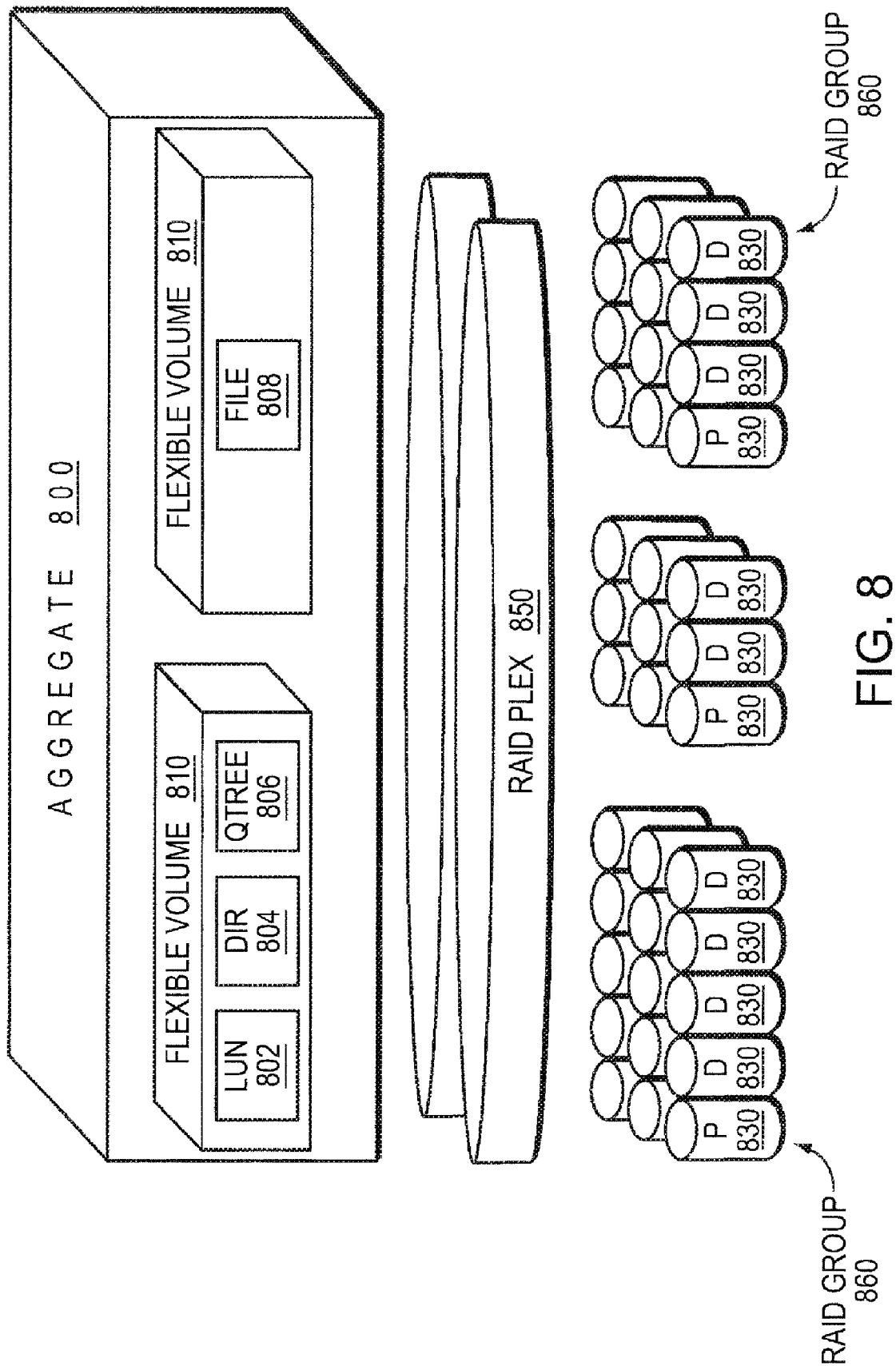
FIG. 8 is a schematic block diagram of an exemplary aggregate in accordance with an illustrative embodiment of the present invention.

FIG. 8 is a schematic block diagram of an embodiment of an aggregate 800 that may be advantageously used with the present invention. Luns (blocks) 802, directories 804, qtrees 806 and files 808 may be contained within flexible volumes 810, such as dual vbn flexible volumes, that, in turn, are contained within the aggregate 800. The aggress gate 800 is illustratively layered on top of the RAID system, which is represented by at least one RAID plex 850 (depending upon whether the storage configuration is mirrored), wherein each plex 850 comprises at least one RAID group 860. Each RAID group further comprises a plurality of disks 830, e.g., one or more data (D) disks and at least one (P) parity disk.

Whereas the aggregate 800 is analogous to a physical volume of a conventional storage system, a flexible volume is analogous to a file within that physical volume. That is, the aggregate 800 may include one or more files, wherein each file contains a flexible volume 810 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 810 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a file system file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc. In accordance with the present invention, the storage label file also includes a rollback required flag, which is also illustrated in FIG. 5 as ROLLBACK section 532 of the raid label 530.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 400; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

G. VLDB

Figure 9:
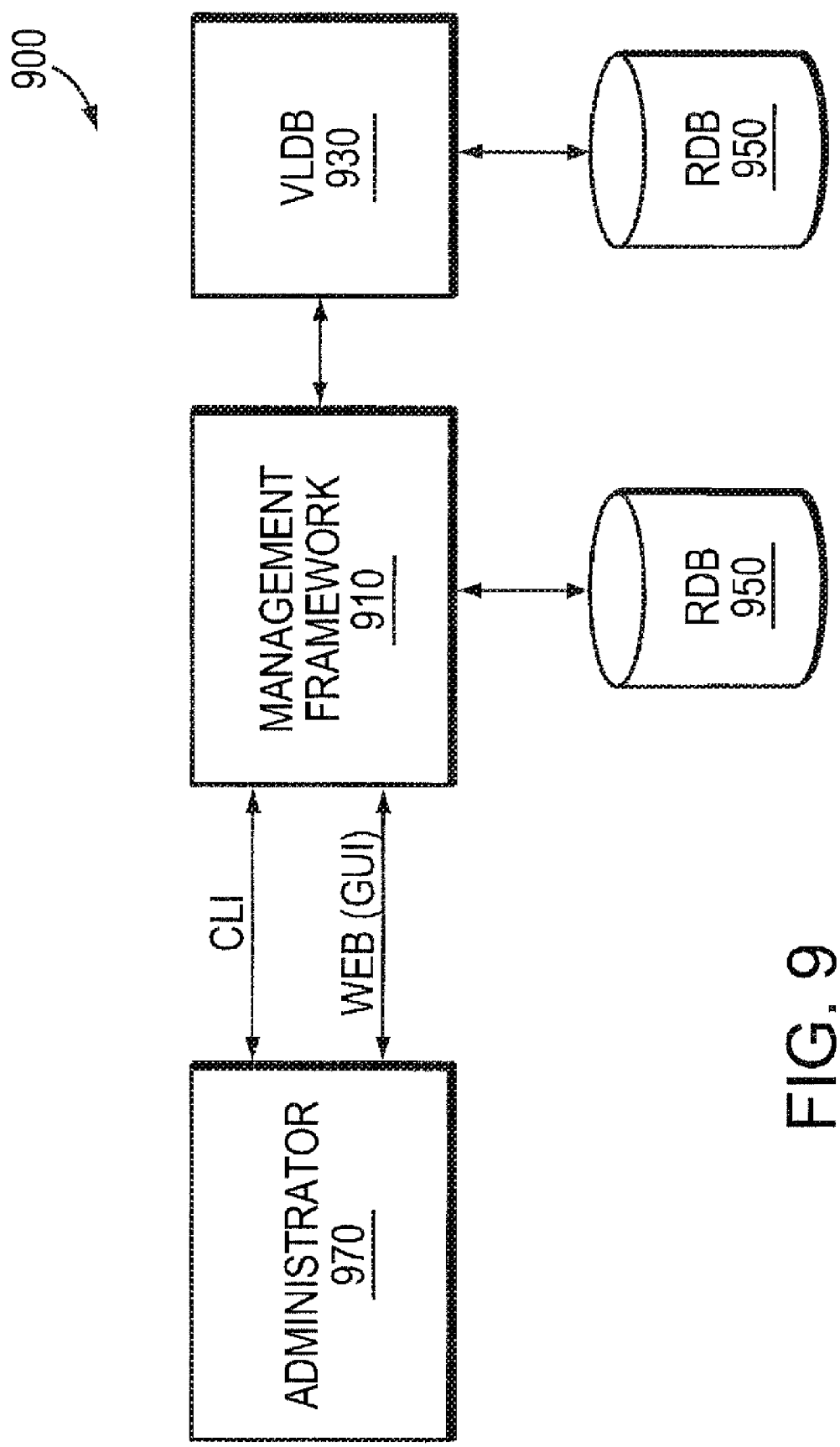
FIG. 9 is a schematic block diagram illustrating a collecting of management processes in accordance with an illustrative embodiment of the present invention.

FIG. 9 is a schematic block diagram illustrating a collection of management processes that execute as user mode applications 900 on the storage operating system 300 to provide management of configuration information (i.e. management data) for the nodes of the cluster. To that end, the management processes include a management framework process 910 and a volume location database (VLDB) process 930, each utilizing a data replication service (RDB 950) linked as a library. The management framework 910 provides a user to an administrator 970 interface via a command line interface (CLI) and/or a is web-based graphical user interface (GUI). The management framework is illustratively based on a conventional common interface model (CIM) object manager that provides the entity to which users/system administrators interact with a node 200 in order to manage the cluster 100.

The VLDB 930 is a database process that tracks the locations of various storage components (e.g., SVSs, flexible volumes, aggregates, etc.) within the cluster 100 to thereby facilitate routing of requests throughout the cluster. In the illustrative embodiment, the N-module 310 of each node accesses a configuration table 235 that maps the SVS ID of a data container handle to a D-module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 810") and aggregates 800 within the cluster. The VLDB illustratively implements a RPC interface, e.g., a Sun RPC interface, which allows the N-module 310 to query the VLDB 930. When encountering contents of a data container handle that are not stored in its configuration table, the N-module sends an RPC to the VLDB process. In response, the VLDB 930 returns to the N-module the appropriate mapping information, including an ID of the D-module that owns the data container. The N-module caches the information in its configuration table 235 and uses the D-module ID to forward the incoming request to the appropriate data container. All functions and interactions between the N-module 310 and D-module 350 are coordinated on a cluster-wide basis through the collection of management processes and the RDB library user mode applications 900.

To that end, the management processes have interfaces to (are closely coupled to) RDB 950. The RDB comprises a library that provides a persistent object store (storing of objects) for the management data processed by the management processes. Notably, the RDB 950 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

H. Storage System Architecture

The present invention is related to a storage system architecture illustratively comprising two or more volumes 810 distributed across a plurality of nodes 200 of cluster 100. The volumes are organized as a SVS and configured to store content of data containers, such as files and luns, served by the cluster in response to multi-protocol data access requests issued by clients 180. Notably, the content of each data container is apportioned among the volumes of the SVS to thereby improve the efficiency of storage service provided by the cluster. To facilitate a description and understanding of the present invention, data containers are hereinafter referred to generally as "files".

Each data container such as a volume, is associated with a data set identifier (DSID) and each instantiation of the data container that represents a single point in time image of the container's data set is associated with a DSID. Furthermore, the entire collection of the data container and its instantiations is associated with a master data set identifier (MSID). Thus, a single MSID may be associated with a plurality of DSIDs within the clustered storage system. A volume location database (VLDB) utilizes a replicated database among the storage systems of the cluster, to maintain a data set data structure containing appropriate mapping information between the MSIDs and DSIDs. DSIDs may be created and/or destroyed by modifying the number of instantiations of the data container by, e.g., establishing a new mirroring relationship, breaking a mirror, creating a snapshot or persistent consistency point image (PCPI) of data, etc.

Clients of the clustered storage system utilize MSIDs to access data of the data containers. When receiving a data access request containing a MSID, a storage system accesses the VLDB to identify an appropriate DSID to which to forward the request. Upon identifying the appropriate DSID to forward the request, the storage server may utilize mapping tables within the VLDB to identify which storage system within the cluster is currently servicing the identified DSID. The data access request is then forwarded to the appropriate storage system for processing.

The SVS comprises a meta-data volume (MDV) and one or more data volumes (DV). The MDV is configured to store a canonical, or definitive, copy of certain metals data, including access control lists (ACLs) and directories, associated with all files stored on the SVS, whereas each DV is configured to store, at least, data content of those files. For each file stored on the SVS, one volume is designated the container attribute volume (CAV) and, to that end, is configured to store ("cache") certain, rapidly-changing attribute meta-data, including time stamps and file length, associated with that file to thereby offload access requests that would otherwise be directed to the MDV. In the illustrative embodiment described herein, determination of the CAV for a file is based on a simple rule: designate the volume holding the first stripe of content (data) for the file as the CAV for the file. Not only is this simple rule convenient, but it also provides an optimization for small files. That is, a CAV may be able to perform certain operations without having to communicate with other volumes of the SVS if the file is small enough to fit within the specified stripe width. Ideally, the first stripes of data for files are distributed among the DVs of the SVS to thereby facilitate even distribution of CAV designations among the volumes of the SVS. In alternate embodiments, data for files is striped across the MDV and the DVs.

Figure 10:
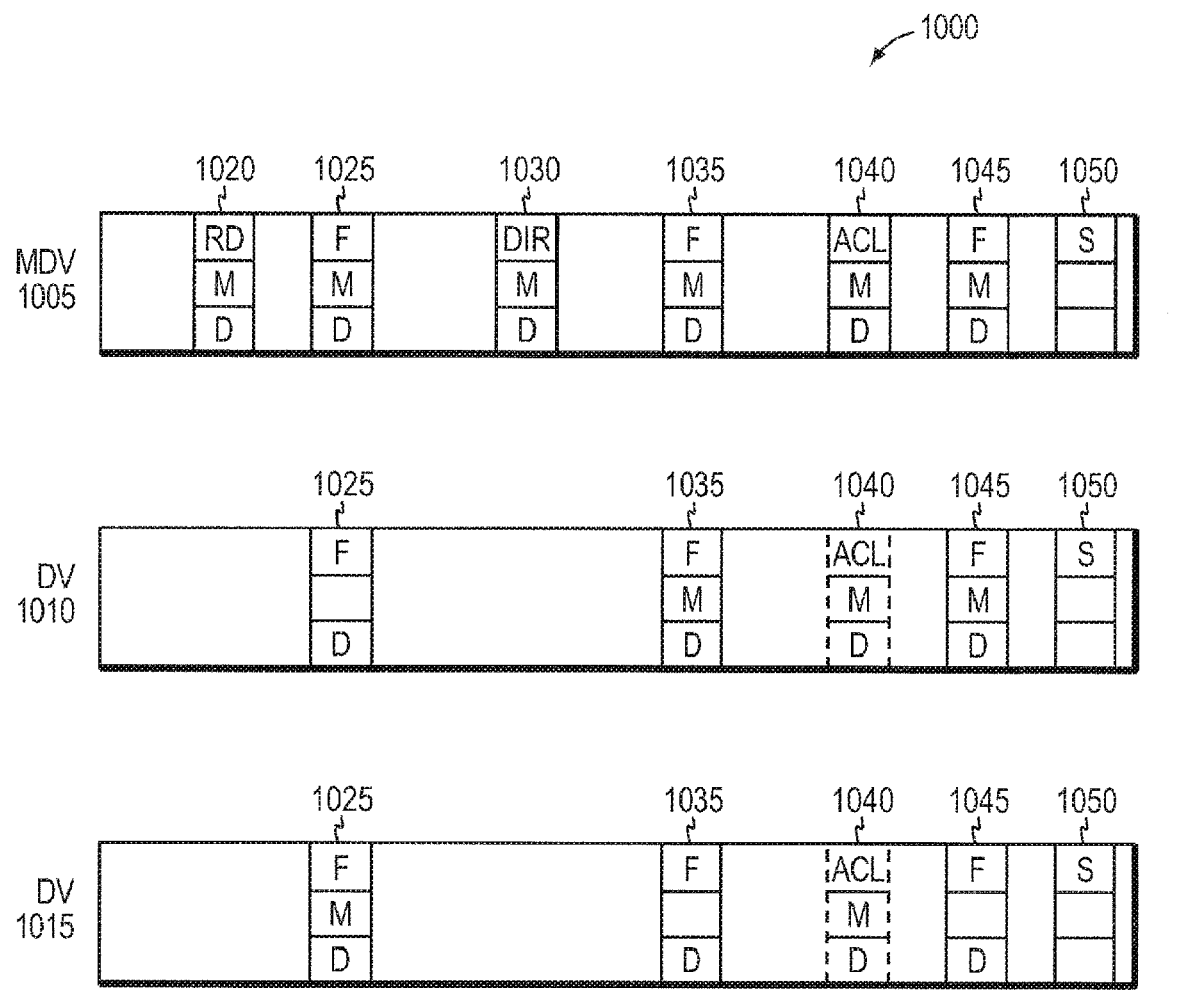

FIG. 10 is a schematic block diagram of inode files of an SVS 1000 in accordance with an embodiment of the present invention. The SVS 1000 illustratively comprises three volumes, namely MDV 1005 and two DVs 1010, 1015. It should be noted that in alternate embodiments additional and/or differing numbers of volumes may be utilized in accordance with the present invention. Illustratively, the MDV 1005 stores a plurality of inodes, including a root directory (RD) inode 1020, a directory (DIR) inode 1030, file (F) inodes 1025, 1035, 1045, an ACL inode 1040, and a snapshot inode 1050. In the illustrative embodiment, the MDV stores one or more snapshots, each of which has a snapshot identification, which is illustratively a STRIPED_SNAPSHOT_MSID. Notably, in alternative embodiments of the invention, the snapshot information may be stored on a DV. Also, each of the inodes on the MDV 1005 illustratively includes meta-data (M) associated with the inode. In the illustrative embodiment, each inode on the MDV 1005 does not include data (D); however, in alternate embodiments, the MDV may include user data.

In contrast, each DV 1010, 1015 stores only file (F) inodes 1025, 1035, 1045, an ACL inode 1040, and a snapshot inode 1050 for the snapshot associated with that DV's volume. A DV does not store directories or other device inodes/constructs, such as symbolic links; however, each DV does store F inodes, and may store cached copies of ACL inodes, that are arranged in the same locations as their respective inodes in the MDV 1005. A particular DV may not store a copy of an inode until an I/O request for the data container associated with the inode is received by the D-module serving a particular DV. Moreover, the contents of the files denoted by these F inodes are periodically sparse according to SVS striping rules, as described further herein. In addition, since one volume is designated the CAV for each file stored on the SVS 1000, DV 1015 is designated the CAV for the file represented by inode 1025 and DV 1010 is the CAV for the files identified by inodes 1035, 1045. Accordingly, these CAVs cache certain, rapidly-changing attribute meta-data (M) associated with those files such as, e.g., file size, as well as access and/or modification time stamps.

The SVS is associated with a set of striping rules that define a stripe algorithm, a stripe width and an ordered list of volumes within the SVS. The striping rules for each SVS are illustratively stored as an entry of VLDB 930 and accessed by SVS ID.

Figure 11:
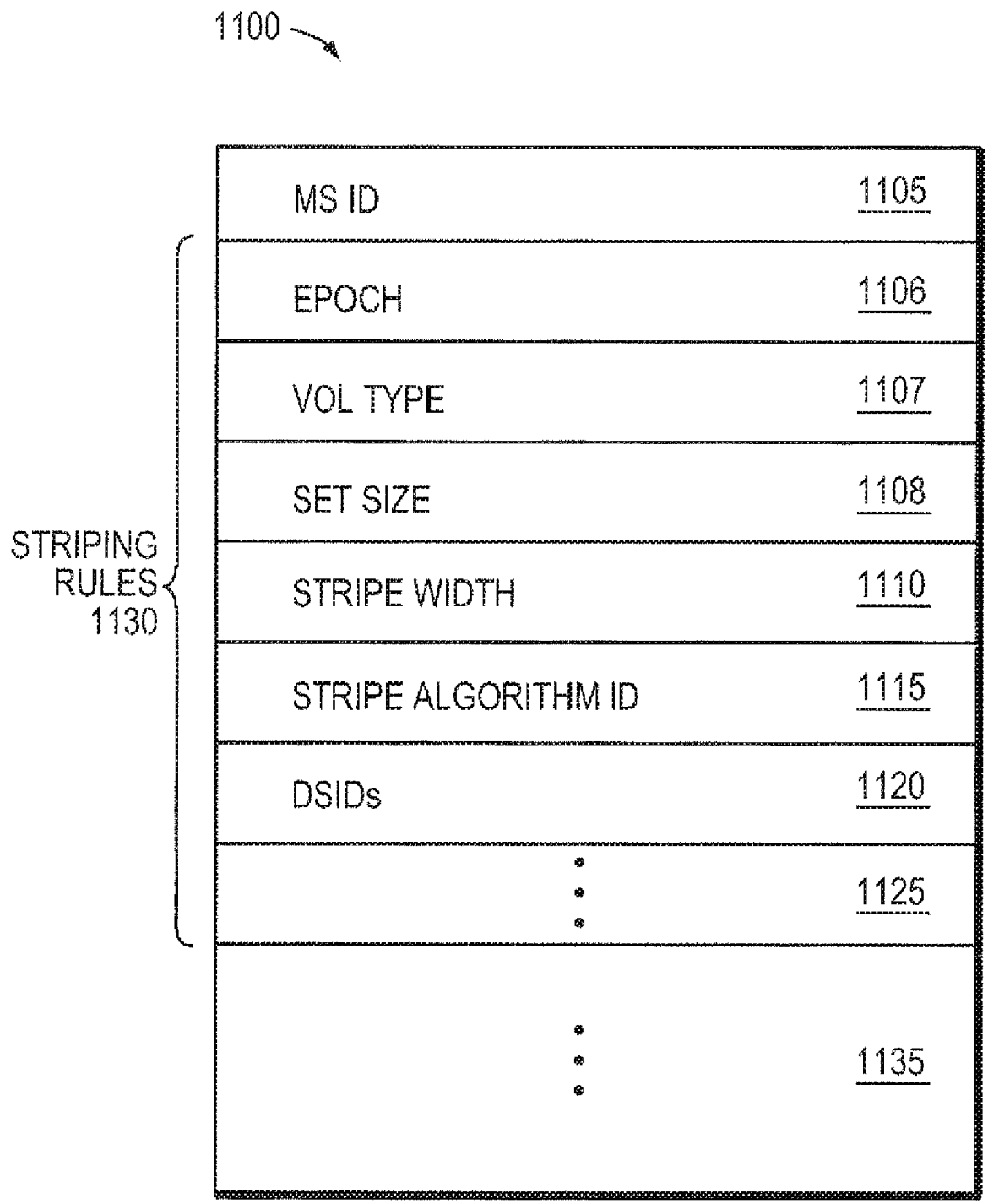
FIG. 11 is a schematic block diagram of the VLDB SVS entry in accordance with an illustrative embodiment of the present invention.

FIG. 11 is a schematic block diagram of an exemplary VLDB SVS entry 1100 in accordance with an embodiment of the present invention. The VLDB entry 1100 includes an MSID ID field 1105 for each volume in the set, and one or more sets of striping rules 1130. In alternate embodiments additional fields 1135 may be included. The MSID field 1105 contains the ID of a volume in SVS. Thus, there is illustratively an entry for each volume in the SVS; alternatively, a larger data structure (not shown) may provide a single entry for the entire SVS which includes the MSIDs and DSIDs for each constituent volume in the SVS.

Each set of striping rules 1130 illustratively includes a striping epoch field 1106 and a type (voltype) field 1107, the latter of which indicates whether the striping rule record refers to the actual volume, or instead refers to a snapshot of the volume. Illustratively, the field 1107 contains a number which designates that the record relates to either a volume or a snapshot. Additionally, the entry includes a set size field 1108. It specifies the number of volumes in the SVS. Similarly, the set size also applies to the snapshot entries because there is a snapshot for each volume in the SVS. The striping rule set also illustratively includes a stripe width field 1110, a stripe algorithm ID field 1115 and a DSID filed 1120. The DSID field 1120 contains an identification of each instantiation of the volume or snapshot series as an ordered list of DSIDs The striping rules 1130 contain information for defining the organization of a SVS. For example, the stripe algorithm ID field 1115 identifies a striping algorithm used with the SVS. In the illustrative embodiment, multiple striping algorithms could be used with a SVS; accordingly, the stripe algorithm ID is needed to identify which particular algorithm is utilized. Each striping algorithm, in turn, specifies the manner in which file content is apportioned as stripes across the plurality of volumes of the SVS. The stripe width field 1110 specifies the size/width of each stripe. The DSID field 1120 contains the IDs of the volumes (or snapshots) comprising the SVS. Moreover, other fields may specify the function and implementation of the various volumes and striping rules of the SVS. For example, one or more other fields 1125, 1135 may denote the MDV of the SVS, and other fields may denote the manner of implementing a particular striping algorithm, e.g., round-robin.

As noted, the Locate( ) function 375 enables the VSM 370 and other modules (such as those of N-module 310) to locate a D-module 350 and its associated volume of a SVS 1000 in order to service an access request to a file. The Locate( ) function takes as arguments, at least (i) a SVS ID 1105, (ii) an offset within the file, (iii) the inode number for the file and (iv) a set of striping rules 1130, and returns the volume 810 on which that offset begins within the SVS 1000. For example, assume a data access request directed to a file is issued by a client 180 and received at the N-module 310 of a node 200, where it is parsed through the multi-protocol engine 325 to the appropriate protocol server of N-module 310.

To determine the location of a D-module 350 to which to transmit a CF message 400, the N-module 310 may first retrieve a SVS entry 1100 to acquire the striping rules 1130 (and list of volumes 1120) associated with the SVS. The N-module 310 then executes the Locate( ) function 375 to identify the appropriate volume to which to direct an operation. Thereafter, the N-module may retrieve the appropriate VLDB volume entry to identify the aggregate containing the volume and the appropriate VLDB aggregate entry to ultimately identify the appropriate D-module 350. The protocol server of N-module 310 then transmits the CF message 400 to the D-module 350.

I. Snapshot Promotion

Briefly, the constituent volumes in the SVS have an active file system. As noted, the cluster programming includes generating periodic snapshots of the active file system. Thus, a series of snapshots are generated for each volume at each node. These snapshots may be used as a recovery technique should the active file system become inconsistent or corrupted, or for example, if an administrator would prefer to view the striped storage system as it existed at an earlier point in time. In such cases, a snapshot provides the latest read-only image of the active file system that is consistent. In accordance with the invention the snapshot is "promoted" in such cases to be the active file system.

Figure 12:
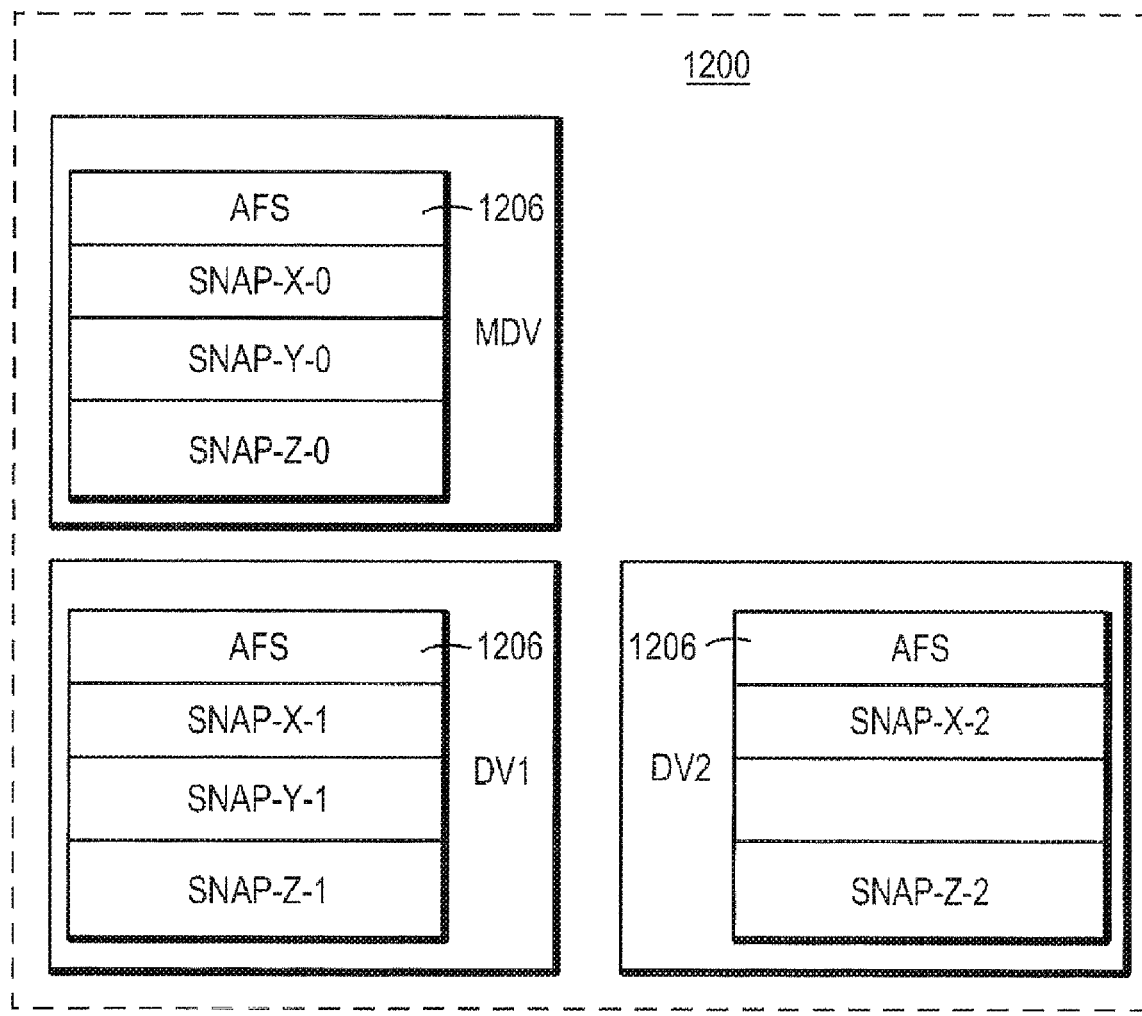
FIG. 12 is a schematic block diagram of an exemplary SVS in accordance with an illustrative embodiment of the present invention showing a snapshot contained within each volume.

FIG. 12 illustrates a cluster 1200 with which the snapshot promotion technique of the present invention may be described. The cluster 1200 contains nodes hosting volumes MDV and DV1 and DV2. Each node typically contains an N-module and a D-module hosting a disk array that comprises the volumes of a SVS. For simplicity, FIG. 12 illustrates just the D-modules hosting MDV, DV1 and DV2. Each MDV, DV1 and DV2 node executes active file system AFS 1206. As noted, a snapshot is periodically generated for each constituent volume of the SVS hosted by the MDV, DV1 and DV2 nodes. For example, in a first time frame, a SVS snapshot series called SNAP-X is generated by, e.g., snapshot manager 362. For each SVS snapshot, a new master snapshot identifier that illustratively may be of the form STRIPED_SNAPSHOT_MSID, which in the illustrative embodiment is SNAP-X. Thus, a snapshot generated of the MDV data set is referred to as SNAPX-0. Each snapshot of each constituent volume of the SVS that is generated in the SNAP-X series is assigned the same STRIPED_SNAPSHOT_MSID, but the actual snapshot stored in the snapshot storage 364 on the D-module for each volume has a unique SNAPSHOT_DSID. Similarly, the snapshot manager 362 schedules and generates a SNAP-X-1 snapshot of constituent volume DV1, and a snapshot SNAP-X-2 of the constituent volume DV2. Subsequently, the snapshot manager 362 generates another set of snapshots for the SVS which is assigned a new STRIPED_SNAPSHOT_MSID of SNAP-Y. That is, the MSID for the SVS snapshot is SNAP-Y and thus the snapshot of the MDV is SNAP-Y-0, and the snapshot of DV1 is SNAP-Y-1. However, assume that in the example, a failure occurred at some point in the SVS snapshot process so that the snapshot of DV2 fails and there is no SNAP-Y-2.

The SVS snapshot process continues, and later, another series of snapshots is generated, which is assigned a new MSID, illustratively, SNAP-Z. Thus, the snapshot at the MDV is SNAP-Z-0, the snapshot at the DV1 is SNAP-Z-1, and the snapshot at DV2 is SNAP-Z-2.

Notably, the snapshot series SNAP-X and SNAP-Z contain a snapshot of each constituent volume in the SVS and thus comprise a complete snapshot of the SVS in what is referred to herein as a "common snapshot." However, the SNAP-Y set of snapshots is incomplete, and thus there is a data inconsistency in that snapshot series. As such, the SNAP-Y series is not considered a common snapshot. As used herein, a common snapshot is a snapshot set that contains a snapshot generated for each constituent volume in the SVS, with each volume having the same STRIPED_SNAPSHOT_MSID. The above description of a partially created snapshot is for illustrative purposes and it should be understood that in a practical application of the invention, the partially created snapshot would typically be cleaned up by a management process and deleted as erroneous and would not be retained as such.

Figure 13:
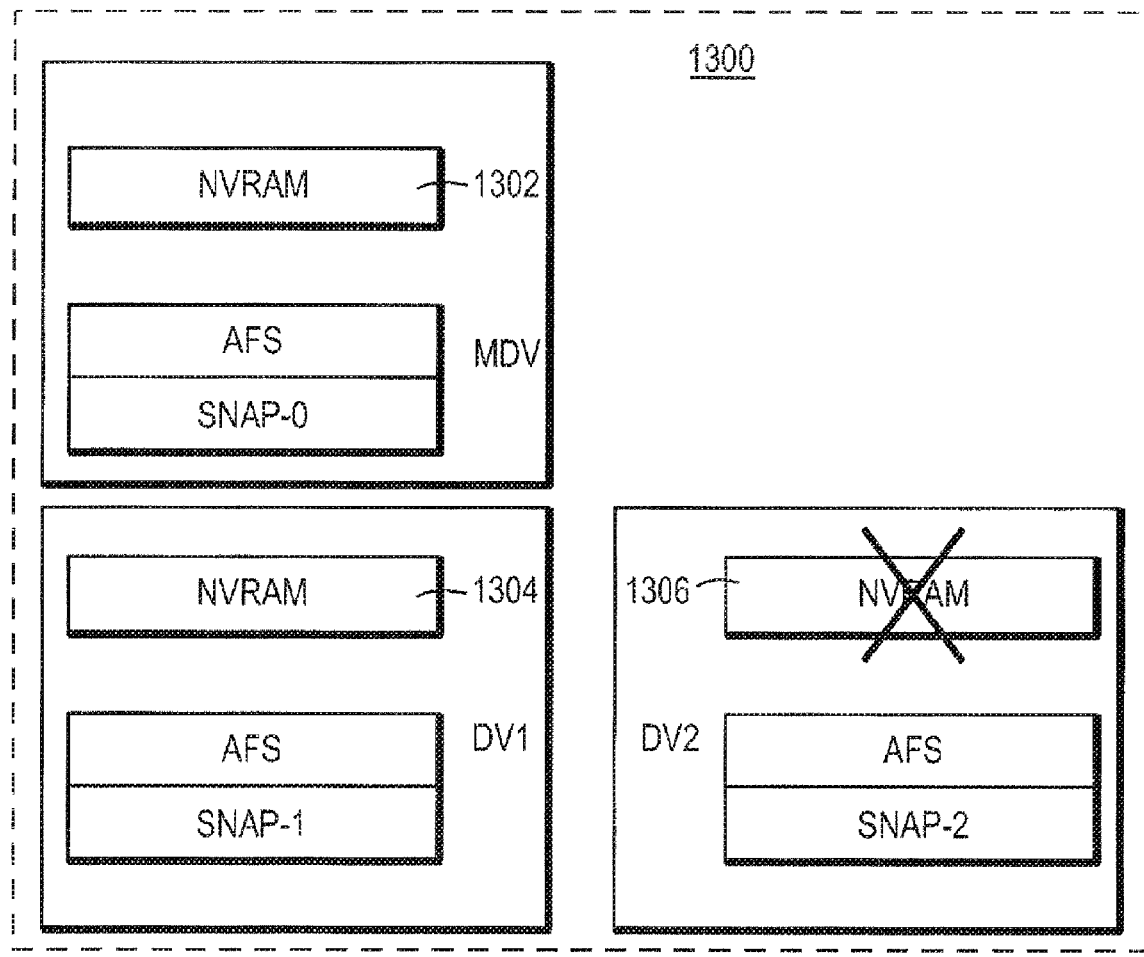
FIG. 13 is a schematic block diagram of the exemplary striped volume set of FIG. 12 illustrating a common snapshot in accordance with the present invention.

FIG. 13 illustrates a cluster 1300 with which the snapshot promotion technique of the present invention may be employed. The cluster 1300 includes three nodes, MDV, DV1 and DV2, each having a N-module and a D-module hosting the disk array comprising the constituent volumes of the SVS. Notably, the MDV has an NVRAM 1302 configured to persistently store current data from an I/O source. Periodically, this data is replayed for permanent storage to disk in a manner which is known to those skilled in the art. Similarly, DV1 has associated NVRAM 1304, and DV2 has associated NVRAM 1706.

In the illustrative embodiment the MDV, DV1 and DV2 are running the active file system AFS and cluster programming includes periodic snapshots, as discussed with reference to FIG. 12. Thus, a series of snapshots SNAP is generated that includes SNAP-0 of the MDV, SNAP-1 of DV1 and SNAP-2 of DV2. These snapshots may be used as a recovery technique should the active file system become inconsistent or corrupted, or for example if an administrator is investigating the system as it existed at an earlier point in time. In such cases, a snapshot provides the latest read-only image of the active file system that is consistent. Thus, the snapshot is "promoted" to be the active file system. By way of example, assume that the NVRAM 1306 of the DV2 fails, as illustrated by the "X" in FIG. 13, such that new data cannot be replayed to disk, thus leading to an inconsistency in data in the cluster 1300. In accordance with the invention, when an NVRAM loss is detected by the file system 360 on a node hosting the affected constituent volume, it notifies the rollback process 366 which thus marks a ROLLBACK REQUIRED flag on the respective constituent volume. This condition is detected by the rollback process on the master volume (MDV) and the rollback procedure as described herein is invoked. Thus, to recover from this error, an earlier snapshot is then used ("promoted") as the active file system. Thus, a command can thus be given to "rollback" to a common snapshot in order to restore the data to a consistent state. As noted, this is also referred herein to as snapshot promotion.

In the example of FIG. 13, the snapshot SNAP is a common snapshot, and thus it is used to restore the active file system to a state of consistency using the technique of the present invention. There may be other instances, (not necessarily a failure) in which an administrator may invoke a command to rollback to an earlier snapshot to check for an error or otherwise to examine the system at a different point in time. Accordingly, the present invention provides a method and system for promoting a snapshot in response to is an administrator's command, or in response to a failure in the system, such as an NVRAM failure that places the system in an inconsistent state.

Figure 14A:
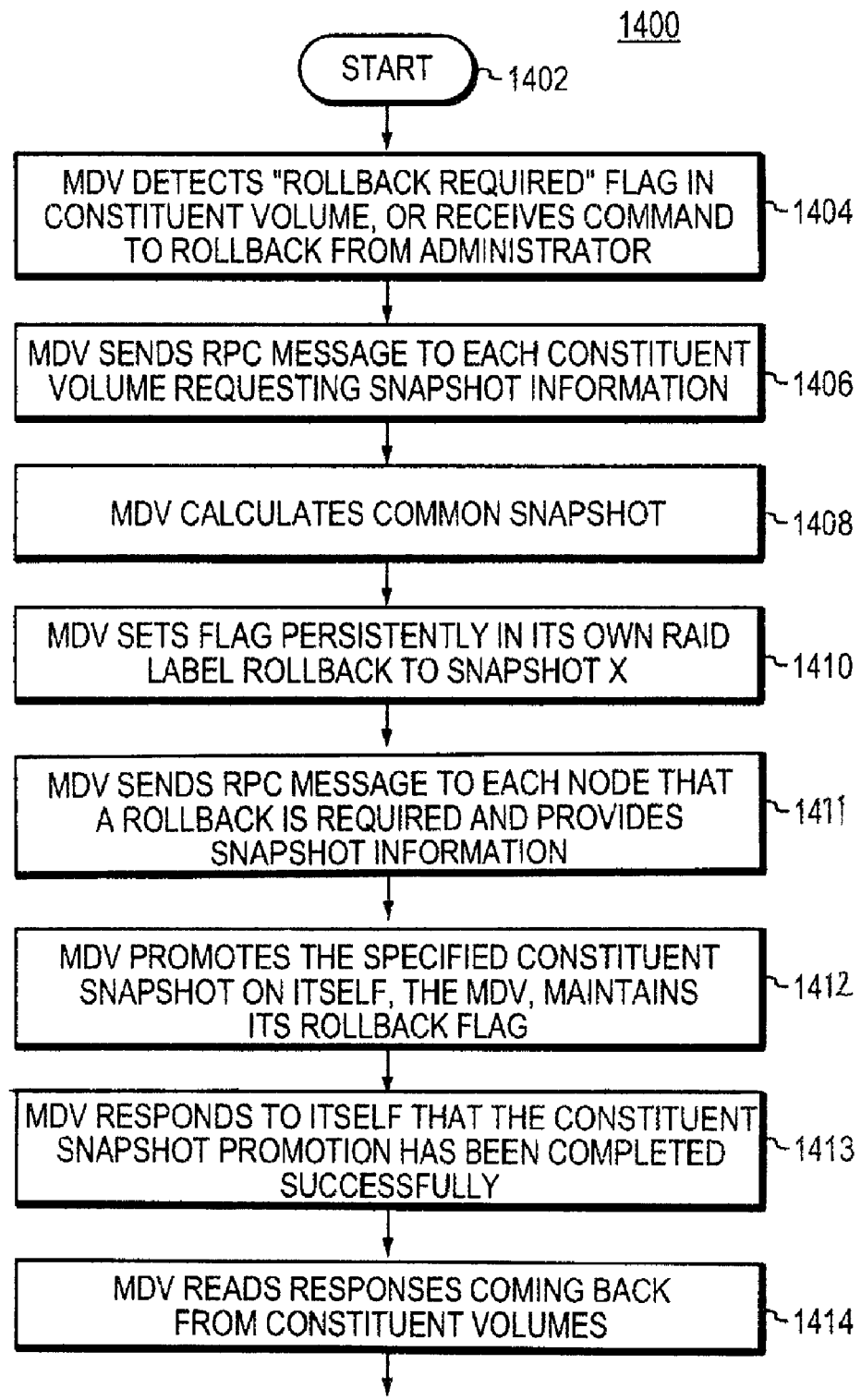
FIGS. 14A and 14B together form a flow chart of the steps of a procedure for promoting a snapshot on the MDV in accordance with an illustrative embodiment of the present invention.
Figure 14B:
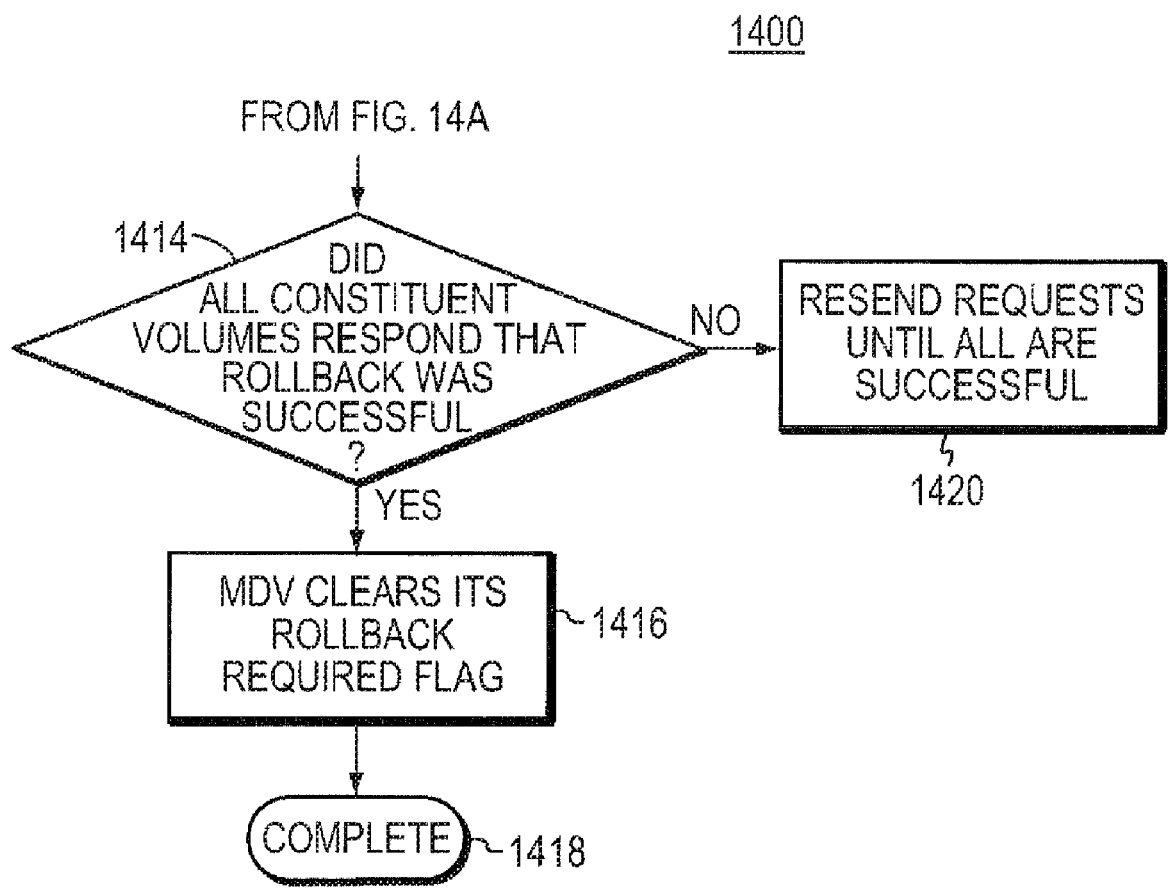

FIGS. 14A and 14B form a flow chart of a procedure of steps, which embody the rollback process 366 which is a thread running on the master volume server in accordance with the invention. In the illustrative embodiment the MDV node is acting as the master volume server, and it is also a constituent volume in the striped volume set. It should be understood that any of the nodes in the cluster may be designated as the master volume server upon configuration or by an administrator in the course of maintenance or other procedures performed with respect to the system. Thus the rollback process 366 running on the master volume server, for example, the MDV node, controls the rollback procedure while the constituent volumes (including the MDV node and the DV nodes) carry out the instructions they receive in order to effect a "rollback" to an earlier snapshot.

The procedure begins at step 1402 and continues to step 1404 when master volume server on which the rollback process 366 is running is notified by an administrator that a rollback is required, or it detects the rollback required in one of the constituent volumes. More specifically, as illustrated in step 1404, an administrator operating at management station 195 may use GUI 196 to enter a command which sends an RPC message across the cluster switching fabric 150 to the MDV node. Alternatively, the rollback process 366 periodically polls each of the nodes in the cluster instructing its RAID system to read the raid label to determine whether any of the nodes has set a persistent flag which indicates that a rollback to an earlier snapshot is required. As discussed with reference to FIG. 5, each volume in the SVS has a raid label 530 with a rollback section 532. The raid label is sometimes more generally referred to as a storage label file. As noted, the storage label includes information such as the flexible volume name, the online/offline status, identity and state information and the ROLLBACK REQUIRED flag of the present invention, which is shown in FIG. 5.

In step 1404, the MDV node queries each constituent volume in the cluster and, detects a "ROLLBACK REQUIRED" flag on one of the DVs. Alternatively, the MDV is node receives a command to rollback from the administrator. In response to detecting the flag or receiving the command, the MDV sends an RPC message to each constituent volume requesting its snapshot information as in step 1406. With the information received, the MDV determines a common snapshot, as shown in step 1408. Illustratively, the rollback process consults the snapshot manager 362 to determine its most recent snapshot as stored in the snapshot storage 364. The rollback process selects the most recent snapshot, or another series of snapshots may be used if, for example, a different time period is of interest. The process then records the STRIPED_SNAPSHOT_MSID, of the selected snapshot in the ROLLBACK section 532 of the raid label 530 on the MDV. This process for determining the common snapshot is illustrated in step 1408, which indicates that the MDV sends an RPC message over the cluster fabric interconnect to remote nodes, or a LPC message to a local node for each constituent volume in the SVS, including the MDV and the DVs. This message queries each volume about its most recent snapshot, or it queries each volume as to whether it has a particular snapshot STRIPED_SNAPSHOT_MSID, such as SNAP-X or SNAP-Y (FIG. 12). The MDV node thus determines a common snapshot and records the common snapshot in the MDV node's own raid label. Alternatively, the MDV may periodically cache information about snapshots, so that it already stores the snapshot information if desired in a particular application of the invention. However, in the illustrative embodiment, the MDV node polls each DV node to determine the common snapshot.

Once the common snapshot is determined, the procedure continues to step 1410 in which the MDV node sets a flag persistently in the ROLLBACK section 532 of its raid label indicating that it is in a ROLLBACK inode. As noted, the MDV identifies the STRIPED_SNAPSHOT_MSID of the common snapshot and also records this information (i.e., SNAP-X, SNAP-Z). In step 1411, the MDV node sends an RPC message to each node (including itself) instructing it to promote the snapshot identified with the STRIPED_SNAPSHOT_MSID. Notably, the constituent snapshots for the constituent volumes have the same STRIPED_SNAPSHOT_MSID for a particular snapshot series. The MDV node so notifies each constituent volume by an appropriate RPC message to rollback to that snapshot by including the snapshot information in the RCP message. Such a message will include the snapshot identifier of the snapshot to be promoted, and will also illustratively include an instruction or command to rollback to that snapshot. The message will be directed to the nodes hosting the constituent volumes, and will also include information that is used for identifying the specific individual volumes in the particular striped volume environment in which the invention is to be implemented.

Then, in step 1412, in response to the ROLLBACK message, the MDV node promotes the identified snapshot itself, and maintains its ROLLBACK flag. The MDV also responds to itself that the rollback has been successfully completed in step 1414. After sending this message to itself and to each DV node of each constituent volume, the MDV node waits for a response from each DV node that it has in fact performed the rollback to the identified snapshot, as shown in step 1414.

The decision step 1415 illustrates that the MDV node determines whether each DV node has replied that the rollback has been completed successfully. If not, the MDV node resends the rollback command message to each DV node to retry as in step 1420. This step also covers the circumstance in which a DV node has sent a reply, but it was not received by the MDV node the first time.

Once the MDV has received a reply from each DV in the cluster that indicates that the rollback has been completed successfully, then the procedure continues to step 1416 where the MDV clears its ROLLBACK REQUIRED flag from its raid label. The procedure ends at step 1418.

Figure 15:
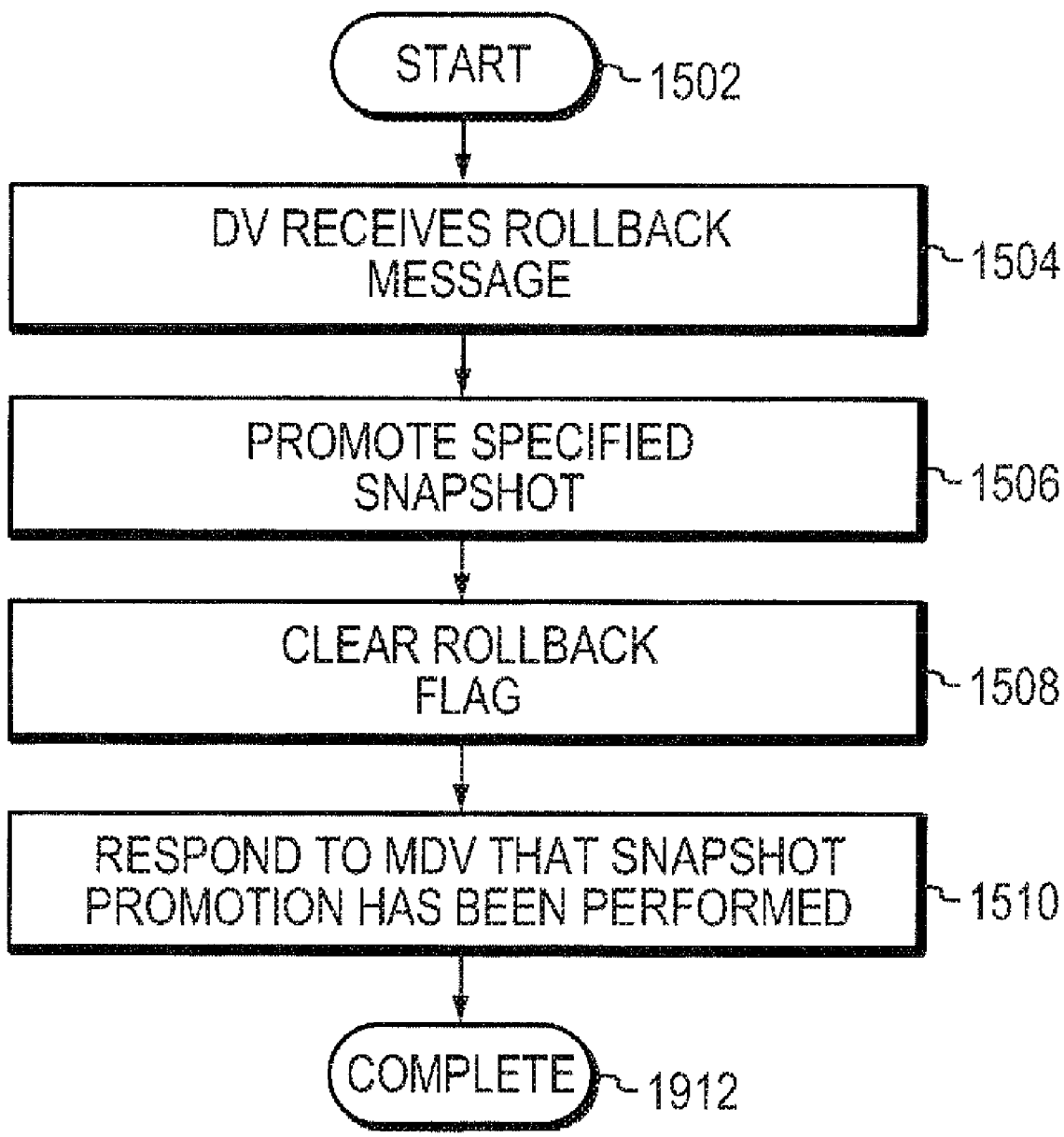
FIG. 15 is a flow chart of a procedure for receiving a command to roll back to a common snapshot on a DV node in accordance with an illustrative embodiment of the present invention.

The procedure on each individual DV node is set forth in the flow chart 1500 of FIG. 15. The procedure begins at step 1502 and continues to step 1504 in which the DV node receives notice from the MDV node that a rollback is required. The in response to this message, the rollback process 366 thread running on the individual DV node executes one or more instructions to the RAID system to mark the ROLLBACK REQUIRED flag in the raid label of its hosted constituent volume. The DV node then promotes the snapshot identified in the message as in step 1506. The DV node clears its ROLLBACK REQUIRED flag (step 1508). The DV node then responds to the MDV is node using an appropriate RPC message which includes an indication that the snapshot promotion has been successfully performed and identifies the snapshot which it has promoted, in step 1510. The procedure completes at step 1512.

Further in accordance with the invention, if a part of the system crashes during the rollback process, the MDV node will have already set the ROLLBACK REQUIRED flag in its raid label. Also, any constituent volume will still have the ROLLBACK REQUIRED flag set if it had not completed its own rollback process prior to the failure. Therefore, upon boot up, the rollback process 366 on the MDV node instructs the RAID system to immediately read the raid labels on each constituent volume (including itself) and particularly to see if any of the constituent volumes such as the MDV has a ROLLBACK REQUIRED flag set. A ROLLBACK REQUIRED notation found in any of the raid labels indicates unfinished rollback work. The MDV node then consults the recorded STRIPED_SNAPSHOT_MSID in its raid label. If it has a valid value, the MDV node sends messages to the DV nodes to calculate the common snapshot and continues the procedure from step 1406 of procedure 1400 (FIGS. 14A and 14B). If it is discovered in the process that all of the DV nodes have already cleared their rollback flags, and their snapshots match the STRIPED_SNAPSHOT_MSID recorded by the MDV node, then the rollback process must have completed prior to the failure, and the MDV node need only clear its rollback flag. If only some of the DV nodes have a ROLLBACK REQUIRED flag or only some have recorded the same STRIPED_SNAPSHOT_MSID as the MDV node, then the MDV node sends messages to only those nodes that have not yet recorded a successful rollback to bring those nodes back into conformance with the correct snapshot as identified by its STRIPED_SNAPSHOT_MSID. If instead, the MDV node finds an UNKNOWN value in its own records, then the rollback process is initiated and the common snapshot is calculated as in step 1408 and the procedure continues from there.

The following Table also summarizes the messages and flags being cleared on the master volume server and in each constituent volume (including the MDV) of the striped volume set in accordance with the present invention:

| | |
|---|---|
| Master Volume | Receives ROLLBACK command from administrator or |
| | Detects ROLLBACK REQUIRED flag in constituent volumes (including MDV and DVs) |
| | Marks its own ROLLBACK REQUIRED flag and records |
| | STRIPED_SNAPSHOT_MSID in its own RAID label |
| | Sends ROLLBACK REQUIRED Message to all constituent (MDV and DVs) volumes with STRIPED_SNAPSHOT_MSID |
| | Waits for response regarding completion of ROLLBACK from each constituent volume |

| | -continued |
|---|---|
| | Upon receiving completion reply from all constituent volumes, Clears its ROLLBACK REQUIRED flag |
| Constituent Volume | Receives message instructing it to ROLLBACK to an earlier snapshot, or detects need to ROLLBACK to an earlier snapshot<br>Marks its ROLLBACK REQUIRED flag and records the snapshot STRIPED_SNAPSHOT_MSID<br>Promotes the snapshot<br>On success, if it is NOT MDV, clears the ROLLBACK REQUIRED flag. If it is MDV, DON'T clear the ROLLBACK REQUIRED flag.<br>Sends response message to master volume that snapshot promotion has been successful |

It should be understood that the present invention provides a mechanism for promotion of a snapshot in a striped volume environment for a system which provides high data availability and integrity, especially in disaster and data recovery scenarios.

The foregoing description has been directed to particular embodiments of the invention. It will be apparent, however, that other variations and modifications may be made to the described embodiments with the attainment of some or all of their advantages. Specifically, it should be noted that the principles of the invention may be implemented in a non-distributed file system. Furthermore, while this description has been written in terms of D and N-modules, the teachings of the present invention are equally suitable to systems in which the functionality of the N and D-modules are implemented in a single system. Alternatively, the functions of the N and D-modules may be distributed among a number of separate systems, wherein in each system performs one or more functions. Additionally, the features of the present invention have been described with respect to a cluster, containing two nodes, however, it is equally applicable to clusters including a plurality of nodes, which allow for an n-way failover. Additionally, the procedures, processes and/or modules described herein may be implemented in hardware, software, embodied as a computer readable medium having program instructions, for one or a combination thereof. Therefore, it is the object of the appended claims to cover all such variations and modifications as come within the true spirit and scope of the invention.

What is claimed is:

1. A method of performing data recovery in a striped volume set, comprising:
    determining a common snapshot for the striped volume set, wherein the common snapshot is a snapshot set that contains a snapshot for each constituent volume in the striped volume set; and
    in response to determining the common snapshot, promoting the common snapshot as an active file system for the striped volume set.

2. The method as defined in claim 1, further comprising:
    detecting that a rollback to the common snapshot is required at a master volume server by receiving a rollback command from an administrator.

3. The method as defined in claim 1, further comprising:
    periodically polling each constituent volume in the striped volume set;
    checking to see if a flag is set in a raid label of a constituent volume;
    in response to the flag in the raid label of the constituent volume being set, setting at a master volume server a flag in its own raid label that a rollback is required;
    at said master volume server determining the common snapshot to determine a rollback snapshot; and
    ii notifying each constituent volume that a rollback is required to the common snapshot.

4. The method as defined in claim 3, further comprising:
    waiting for a response from each constituent volume that the rollback has been successful.

5. The method as defined in claim 4, further comprising:
    in response to the response not being received from each constituent volume that the rollback has been successful, then said master volume server issuing messages to each constituent volume to retry the rollback to the rollback snapshot.

6. The method as defined in claim 3, further comprising:
    when the response from each constituent volume that the rollback has been successful has been received by said master volume server, removing at said master volume server, its rollback flag in its own raid label.

7. The method as defined in claim 1 wherein determining a common snapshot, further comprises:
    sending a query to each constituent volume in the striped volume set to determine snapshot information at that constituent volume; and
    determining the common snapshot based upon the snapshot information received from one or more constituent volumes.

8. The method as defined in claim 1 wherein determining a common snapshot, further comprises:
    retrieving snapshot information from each constituent volumes; and
    determining the common snapshot based upon snapshot information so retrieved.

9. A method of promoting a snapshot in a striped volume set, comprising:
    periodically obtaining snapshots of each constituent volume in the striped volume set;
    configuring a master volume server to detect a rollback required state in the striped volume set;
    in response to detecting the rollback required state, said master volume server setting a flag persistently indicating that a rollback is required;
    determining a common snapshot for the striped volume set and identifying the common snapshot as a rollback snapshot, wherein the common snapshot is a snapshot set that contains a snapshot for each of the constituent volume in the striped volume set; and
    in response to determining the common snapshot, notifying constituent volumes in the striped volume set that the rollback snapshot is to be set as an active file system.

10. The method as defined in claim 9, further comprising:
    receiving responses from each constituent volume that the rollback to the rollback snapshot has been successful; and
    when the response is received from each constituent volume, removing said flag set persistently by said master volume server.

11. A system for promoting a snapshot in a striped volume set, the system comprising:
    a master volume server configured to perform a rollback procedure;
    one or more constituent data volumes configured to store stripes of data of data containers as the striped volume set;

a snapshot manager associated with each one of said constituent volumes, said snapshot manager configured to periodically generate snapshots of an active file system; and a rollback process running on said master volume server configured to generate messages for each of said constituent volumes to instruct each node that hosts each volume to promote a common snapshot as the active file system, wherein the common snapshot is a snapshot set that contains a snapshot for each of the constituent volume in the striped volume set.

12. The system of claim 11, further comprising:
a raid label in each volume, said raid label including a flag field to identify that a rollback is required.

13. The system of claim 11 wherein each constituent data volume of the striped volume set is served by one or more disk elements.

14. The system of claim 11 wherein the striped volume set is defined by a set striping rules.

15. The system of claim 11 wherein a client interfaces with the system using a network element.

16. A computer readable medium containing executable program instructions executed by a processor, comprising:
program instructions that obtain, periodically, snapshots of each constituent volume in a striped volume set;
program instructions that configuring a master volume server to detect a rollback required state in the striped volume set;
program instructions that set a flag persistently, by said master volume, indicating that a rollback is required, in response to program instructions that detect a rollback required state;
program instructions that determine a common snapshot for the striped volume set and identify a common snapshot as a rollback snapshot, wherein the common snapshot is a snapshot set that contains a snapshot for each of the constituent volume in the striped volume set; and
program instructions that notify constituent volumes in the striped volume set that the rollback snapshot is to be set as an active file system.

17. The computer readable medium as defined in claim 16, further comprising:
program instructions that receive responses from each constituent volume that the rollback to the rollback snapshot has been successful; and
program instructions that remove said flag set persistently by said master volume server when a response is received from each constituent volume.

18. The computer readable medium as defined in claim 16, wherein the program instructions that detect the rollback required state at said master volume server receive a rollback command from an administrator.

19. The computer readable medium as defined in claim 16, further comprising:
program instructions that poll, periodically, each constituent volume in the striped volume set;
program instructions that check to see if a flag is set in a raid label of a constituent volume;
program instructions that set, at said master volume server, a flag in its own raid label that a rollback is required in response to the flag being set at the raid label of the constituent volume;
program instructions that determine, at said master volume server, the common snapshot to determine a rollback snapshot; and
program instructions that notify each constituent volume that the rollback is required to the rollback snapshot.

20. The computer readable medium as defined in claim 16 further comprising:
program instructions that wait for a response from each constituent volume that the rollback has been successful; and
program instructions that issue messages by said master volume server to each constituent volume to retry the rollback to the rollback snapshot, in response to not receiving from each constituent volume a message that the rollback has been successful.

21. A method of performing data recovery in a striped volume set, comprising:
periodically polling each constituent volume in the striped volume set;
checking to see if a flag is set in a raid label of a constituent volume;
in response to the flag being set in the raid label of the constituent volume, setting at a master volume server a flag in its own raid label that a rollback is required;
in response to the rollback being required, determining a common snapshot for the striped volume set, wherein the common snapshot is a snapshot set that contains a snapshot for each constituent volume in the striped volume set;
notifying each constituent volume that the rollback is required to the common snapshot; and
promoting the common snapshot as an active file system at each constituent volume of the striped volume set.

22. The method as defined in claim 21, further comprising:
waiting for a response from each constituent volume that the rollback has been successful.

23. The method as defined in claim 22, further comprising:
in response to the response not being received from each constituent volume that the rollback has been successful, then said master volume server issuing messages to each constituent volume to retry the rollback to the rollback snapshot.

24. The method as defined in claim 21, further comprising:
when the response from each constituent volume that the rollback has been successful has been received by said master volume server, removing at said master volume server, its rollback flag in its own raid label.

25. The method as defined in claim 21 wherein the determining a common snapshot, further comprises:
sending a query to each constituent volume in the striped volume set to determine snapshot information at that constituent volume; and
determining the common snapshot based upon the snapshot information received from one or more constituent volumes.

26. The method as defined in claim 21 wherein determining a common snapshot, further comprises:
retrieving snapshot information from each constituent volumes; and
determining the common snapshot based upon the retrieved snapshot information.

27. A system for promoting a snapshot in a striped volume set, the system comprising:
one or more constituent data volumes configured to store stripes of data of data containers as the striped volume set;
a snapshot manager associated with each one of said constituent volumes, the snapshot manager configured to periodically generate snapshots of that constituent volume;

a master volume server configured to periodically poll each constituent volume in the striped volume set to see if a flag is set in a raid label of each constituent volume, the master volume further configured to set a flag in its own raid label that a rollback is required in response to a flag being set at the raid label of the constituent volume; and a rollback process running on said master volume server configured to generate messages for each constituent volume instructing each node hosting each constituent volume that the rollback is required and to promote a common snapshot as an active file system, wherein the common snapshot is a snapshot set that contains a snapshot for each of the constituent volume in the striped volume set.

28. The system of claim 27 wherein each constituent data volume of the striped volume set is being served by one or more disk elements.

29. The system of claim 27 wherein the striped volume set is defined by a set striping rules.

30. The system of claim 27 wherein a client interfaces with the system using a network element.

* * * * *

UNITED STATES PATENT AND TRADEMARK OFFICE
CERTIFICATE OF CORRECTION

| | | |
|---|---|---|
| PATENT NO. | : 7,827,350 B1 | Page 1 of 1 |
| APPLICATION NO. | : 11/741626 | |
| DATED | : November 2, 2010 | |
| INVENTOR(S) | : Tianyu Jiang et al. | |

It is certified that error appears in the above-identified patent and that said Letters Patent is hereby corrected as shown below:

Col. 16, line 11 should read: "face module 340 is organized as a CF ~~enis~~ encoder and CF"

Col. 17, line 31 should read: "(e.g., ~~Mode~~ inode or indirect block). On a read path of a logical"

Col. 17, line 34 should read: "which, in turn, points to an ~~Mode~~inode file and its corresponding"

Col. 17, line 35 should read: "~~Mode~~ inode buffer tree. The read path on a flexible volume is"

Col. 17, line 47 should read: "e.g., level 1(L1) indirect blocks, ~~inode~~ file level 0 (L0)"

Col. 17, line 51 should read: "level) ~~Mode~~ inode 722, such as an embedded ~~Mode~~inode, references"

Col. 17, line 66 should read: "accessing an owner map to ~~perm form~~perform pvbn-to-vvbn transla-"

Col. 18, line 6 should read: "contained within the aggregate 800. The ~~aggress gate~~aggregate 800 is"

Col. 24, line 21 should read: "system for promoting a snapshot in response to ~~is~~ an admin-"

Col. 25, line 28 should read: "label indicating that it is in a ROLLBACK ~~inode~~mode. As noted, the"

Signed and Sealed this
Fourth Day of October, 2011

David J. Kappos
*Director of the United States Patent and Trademark Office*